(12) United States Patent
Buell et al.

(10) Patent No.: US 11,654,996 B2
(45) Date of Patent: May 23, 2023

(54) ELECTRIC SADDLE TYPE VEHICLE

(71) Applicant: FUELL Inc., New York, NY (US)

(72) Inventors: Erik Buell, Mukwonago, WI (US); Edward Matthew Laben, Mukwonago, WI (US); Daniel David Hurda, Mequon, WI (US)

(73) Assignee: FUELL Inc., New York, NY (US)

( * ) Notice: Subject to any disclaimer, the term of this patent is extended or adjusted under 35 U.S.C. 154(b) by 522 days.

(21) Appl. No.: 16/804,690

(22) Filed: Feb. 28, 2020

(65) Prior Publication Data

US 2020/0339210 A1 Oct. 29, 2020

Related U.S. Application Data

(63) Continuation-in-part of application No. 16/746,372, filed on Jan. 17, 2020, which is a continuation-in-part
(Continued)

(51) Int. Cl.
*B62K 11/04* (2006.01)
*B62M 7/02* (2006.01)
*B62J 1/08* (2006.01)

(52) U.S. Cl.
CPC ............. *B62K 11/04* (2013.01); *B62J 1/08* (2013.01); *B62M 7/02* (2013.01); *B60L 2200/12* (2013.01); *B62K 2204/00* (2013.01)

(58) Field of Classification Search
CPC ........ B62K 11/04; B62K 11/10; B62K 19/40; B62K 19/48; B62K 2204/00;
(Continued)

(56) References Cited

U.S. PATENT DOCUMENTS 4,830,134 A 5/1989 Hashimoto
4,940,111 A 7/1990 Nogami et al.
(Continued)

FOREIGN PATENT DOCUMENTS

DE 102015001959 A1 8/2016
EP 1783039 A1 5/2007
(Continued)

OTHER PUBLICATIONS

Honda-Pro Kevin, "2016 Honda NC700X DCT ABS Review / Specs / Pictures & Videos," visited May 3, 2018, at http://www.hondaprokevin.com/motorcycles-models/2016/honda-nc700x-dct-abs-review-specs-nc700xdg-adventure.
(Continued)

*Primary Examiner* — Kevin Hurley
*Assistant Examiner* — Maurice L Williams
(74) *Attorney, Agent, or Firm* — Banner & Witcoff, Ltd.

(57) ABSTRACT

A motorcycle, or saddle type vehicle, is disclosed that may have at least one seat and at least two wheels, at least one hub electric motor. A large dry storage compartment may be positioned between the rider and steering mount. A rechargeable battery and battery management system may be located below the storage compartment in a battery housing, where the battery housing may be a structural component of the chassis. A rear electronics housing may be attached to and located behind the battery housing, and may contain major electrical components such as electric motor controller and contactors. Two structural members, or frame side rails, may form sides of the storage compartment and extend between the electronics housing and steering mount. The electronics housing may also connect to the battery housing such that the battery housing reinforces and strengthens the chassis, or structural frame. A secondary storage compartment may be located under the seat. Additionally, the storage compart-
(Continued)

ments may have electronic locking mechanisms that are activated via a wireless connection to a remote electronic device. The rear suspension may include a swingarm on one side of the vehicle.

19 Claims, 27 Drawing Sheets

Related U.S. Application Data of application No. 16/396,165, filed on Apr. 26, 2019, now Pat. No. 11,299,229.

(60) Provisional application No. 62/823,813, filed on Mar. 26, 2019, provisional application No. 62/812,156, filed on Feb. 28, 2019, provisional application No. 62/812,166, filed on Feb. 28, 2019, provisional application No. 62/793,670, filed on Jan. 17, 2019, provisional application No. 62/776,036, filed on Dec. 6, 2018, provisional application No. 62/663,803, filed on Apr. 27, 2018.

(58) Field of Classification Search
CPC . B62K 25/005; B62K 25/283; B60L 2200/12; B62M 7/02; B62M 7/12; B62J 1/08; B62J 6/05; B62J 6/055; B62J 9/14; B62J 25/06; B62J 25/08; B62J 41/00; B62J 43/16; B62J 43/28
See application file for complete search history.

(56) References Cited

U.S. PATENT DOCUMENTS

| | | | |
|---|---|---|---|
| 5,020,625 A | 6/1991 | Yamauchi et al. | |
| 5,127,560 A | 7/1992 | Miyamoto et al. | |
| 5,127,561 A | 7/1992 | Miyamoto | |
| 5,147,077 A | 9/1992 | Nakajima et al. | |
| 5,291,067 A | 3/1994 | Nakajima et al. | |
| 5,388,660 A | 2/1995 | Shirasagi et al. | |
| 6,687,592 B2 | 2/2004 | Grob et al. | |
| 7,446,222 B2 | 11/2008 | Bit et al. | |
| 7,931,110 B2 | 4/2011 | Nishiura et al. | |
| 8,002,067 B2 | 8/2011 | Nishiura et al. | |
| 8,265,814 B2 | 9/2012 | Cominetti | |
| 8,360,188 B2* | 1/2013 | Yonehana | B62M 7/12 180/220 |
| 8,453,782 B2* | 6/2013 | Kondo | B62M 7/12 180/291 |
| 8,455,128 B2 | 6/2013 | Belton | |
| 8,485,299 B2 | 7/2013 | Iida | |
| 8,627,916 B2 | 1/2014 | Shinde et al. | |
| 8,662,229 B2 | 3/2014 | Nakagome et al. | |
| 8,672,077 B2 | 3/2014 | Sand et al. | |
| 8,783,405 B2* | 7/2014 | Irie | B62K 11/04 180/312 |
| 8,789,640 B2 | 7/2014 | Matsuda | |
| 8,915,325 B2* | 12/2014 | Kikuchi | B62K 11/10 180/219 |
| 8,919,482 B2 | 12/2014 | Matsuda | |
| 8,957,618 B2 | 2/2015 | Tadano et al. | |
| 9,193,410 B2* | 11/2015 | Watanabe | B62M 7/12 |
| 9,211,934 B2 | 12/2015 | Eguchi | |
| 9,216,787 B2 | 12/2015 | Duncan et al. | |
| 9,242,599 B2* | 1/2016 | Shimizu | G10K 11/004 |
| 9,394,024 B2 | 7/2016 | Maeda et al. | |
| 9,415,691 B2 | 8/2016 | Murakami et al. | |
| 9,415,821 B2* | 8/2016 | Oishi | B62J 17/02 |
| 9,434,441 B1 | 9/2016 | Sand | |
| 9,493,206 B1 | 11/2016 | Oh | |
| 9,551,403 B2* | 1/2017 | Kakemizu | F16H 9/16 |
| 9,963,184 B2* | 5/2018 | Inoue | B62J 43/16 |
| 10,046,667 B2 | 8/2018 | Orimo | |
| 10,322,768 B2 | 6/2019 | Morotomi et al. | |
| 10,427,541 B2* | 10/2019 | Yamamoto | B62M 7/00 |
| 10,464,497 B2 | 11/2019 | Kondo et al. | |
| 10,464,633 B2 | 11/2019 | Zhu et al. | |
| 10,696,350 B2 | 6/2020 | Futamata et al. | |
| 10,850,790 B2 | 12/2020 | Kudo et al. | |
| 11,192,604 B2 | 12/2021 | Carmignani et al. | |
| 2004/0036609 A1 | 2/2004 | Kojika et al. | |
| 2004/0118889 A1 | 6/2004 | Hamilton | |
| 2004/0214680 A1 | 10/2004 | Schoon | |
| 2008/0246315 A1 | 10/2008 | Ito | |
| 2011/0175467 A1 | 7/2011 | Belton | |
| 2011/0186400 A1 | 8/2011 | Villeneuve | |
| 2011/0233994 A1 | 9/2011 | Harding et al. | |
| 2012/0000720 A1* | 1/2012 | Honda | B62K 11/10 180/65.1 |
| 2012/0082881 A1* | 4/2012 | Tsukamoto | H01M 50/284 429/158 |
| 2012/0138375 A1 | 6/2012 | Hughes | |
| 2012/0199409 A1* | 8/2012 | Nakamura | B60L 53/18 180/220 |
| 2012/0234619 A1 | 9/2012 | Nakagome et al. | |
| 2013/0162009 A1 | 6/2013 | Mitts et al. | |
| 2013/0257374 A1* | 10/2013 | Ichikawa | B60L 53/16 320/109 |
| 2013/0282219 A1 | 10/2013 | Matsuda | |
| 2013/0292198 A1 | 11/2013 | Matsuda | |
| 2013/0299265 A1 | 11/2013 | Marazzi | |
| 2014/0027193 A1 | 1/2014 | Annaberger et al. | |
| 2014/0297074 A1 | 10/2014 | Lee et al. | |
| 2014/0297079 A1 | 10/2014 | Saitoh | |
| 2014/0305729 A1 | 10/2014 | Testoni et al. | |
| 2015/0008061 A1 | 1/2015 | Matsuda | |
| 2015/0042160 A1 | 2/2015 | Matsuda | |
| 2015/0075889 A1 | 3/2015 | Eguchi | |
| 2015/0122563 A1 | 5/2015 | Kondo et al. | |
| 2015/0232150 A1* | 8/2015 | Kosuge | B62J 43/28 180/220 |
| 2015/0258898 A1 | 9/2015 | Matsuda | |
| 2015/0329011 A1 | 11/2015 | Kawai | |
| 2015/0329176 A1 | 11/2015 | Inoue | |
| 2015/0375596 A1 | 12/2015 | Blain et al. | |
| 2016/0039489 A1 | 2/2016 | Platz | |
| 2016/0200381 A1 | 7/2016 | Lorbiecki et al. | |
| 2016/0214677 A1 | 7/2016 | Mizuta et al. | |
| 2016/0347281 A1 | 12/2016 | Wu et al. | |
| 2017/0113634 A1* | 4/2017 | Tanaka | B62M 23/02 |
| 2017/0282989 A1 | 10/2017 | Niijima et al. | |
| 2018/0050593 A1 | 2/2018 | Gherardi et al. | |
| 2018/0099675 A1 | 4/2018 | Boisvert et al. | |
| 2018/0154974 A1 | 6/2018 | Toyota et al. | |
| 2018/0215437 A1 | 8/2018 | Kurabayashi | |
| 2018/0215440 A1 | 8/2018 | Omosako | |
| 2019/0305276 A1 | 10/2019 | Suzuki et al. | |
| 2019/0329836 A1 | 10/2019 | Buell | |
| 2020/0180577 A1 | 6/2020 | Buell et al. | |
| 2020/0223504 A1 | 7/2020 | Buell | |
| 2020/0269942 A1 | 8/2020 | Kondo et al. | |
| 2020/0398918 A1 | 12/2020 | Buell et al. | |

FOREIGN PATENT DOCUMENTS

| | | |
|---|---|---|
| EP | 2130751 A1 | 12/2009 |
| EP | 3450296 A1 | 3/2019 |
| IT | TO20030942 A1 | 6/2004 |
| JP | 2017081486 A | 5/2017 |
| WO | 2011/101908 A1 | 8/2011 |

OTHER PUBLICATIONS

Bennetts, "Honda NC750X (2016): First Ride and Review!", visited May 3, 2018, at https://www.bennetts.co.uk/bikesocial/reviews/bikes/honda/honda-nc750x-2016.

Erik Buell et al., "EMN Short Newsflash | First New Designs from VanguardSpark with Erik Buell," visited Apr. 27, 2018 at <https://electricmotorcycles.news/emn-short-newsflash-first-new-designs-from-vanguardspark-with-erik-buell/>.

(56) References Cited

OTHER PUBLICATIONS

Photograh for "Helmet Storage".
Jul. 11, 2019—(WO) ISR and WO—App. No. PCT/US19/29458.
Feb. 20, 2020—(WO) ISR & WO—App. No. PCT/US19/65038.
Apr. 6, 2020—(WO) ISR & WO—App. No. PCT/US2020/014158.
Aug. 12, 2020—(WO) ISR & WO—App. No. PCT/US20/20397.

* cited by examiner

ELECTRIC SADDLE TYPE VEHICLE

CROSS-REFERENCE TO RELATED APPLICATIONS

This application is a continuation-in-part of U.S. patent application Ser. No. 16/746,372 filed on Jan. 17, 2020, which is a continuation-in-part of U.S. patent application Ser. No. 16/396,165 filed on Apr. 26, 2019. U.S. patent application Ser. No. 16/396,165 claims priority to U.S. Provisional Application No. 62/663,803 filed on Apr. 27, 2018, U.S. Provisional Application No. 62/776,036 filed on Dec. 6, 2018, U.S. Provisional Application No. 62/793,670 filed on Jan. 17, 2019, U.S. Provisional Application No. 62/812,156 filed on Feb. 28, 2019, U.S. Provisional Application No. 62/812,166 filed on Feb. 28, 2019, and U.S. Provisional Application No. 62/823,813 filed on Mar. 26, 2019. All of the above referenced applications are incorporated by reference in their entirety.

FIELD OF INVENTION

This disclosure generally relates to an electric vehicle, more specifically, aspects relate to a saddle type vehicle.

BACKGROUND

Although there have been many electric motorcycle, or a saddle type vehicle, products proposed and a number are in production, most of the products follow a conventional perspective of a motorcycle by replacing an internal combustion engine with an electric motor and attaching a battery much as a fuel tank would be added to a conventional motorcycle. These products also may integrate the electric motor as a part of the chassis much like an internal combustion motor is often used as a chassis component on a conventional motorcycle. As other options, the products may be designed for quick removal of battery packs to enable recharging indoors, while some may be designed to protect the batteries for use off road, where shorter travel distances make electric motorcycles a more viable option.

The unique clean operation of electric vehicles is highly desirable in urban areas, and use of two wheelers is seen in urban areas due to traffic flow and parking considerations. Indeed, the limited range of batteries and a recharging infrastructure in its infancy make urban areas the ideal location for electric two wheelers. The concerns of urban use in highly populated areas for increased potential theft of vehicle, goods in storage areas, and vandalism of the charge port, as well as possible electrical injury may need to be minimized.

BRIEF SUMMARY

The disclosure may relate to a chassis design for a motorcycle and more specifically to a motorcycle frame structure, which includes the battery housing as a structural member, encloses a large dry storage area between upper frame rails and the battery housing. This design may locate the battery weight as low and forward as possible for optimum weight distribution, while also enclosing the batteries and electronics in a structural box, which adds substantial stiffness and strength to the frame assembly. With this type of structural battery housing attached to the bottom of the frame rails, these main frame rails can be narrow in cross-section and widely spaced apart, thus leaving a large storage space above the battery housing and in front of the rider. This frame utilizes two parallel beam-like structural members of that have a cross-sectional profile with a vertical height that is greater than a horizontal width on each side of the storage area that is located between upper chassis members between the front and rear wheel suspension. These side structural members may be attached in the front to a steering mount structure to which the steering apparatus and front suspension are attached, and at the rear to a vertical oriented electronics housing structure to which the seat support and the rear suspension are mounted. In addition, the battery housing structure may be attached at the bottom of the frame beam-like structural members, in front of the rear electronics housing structure and below of the front frame structure of the steering mount structure and structural members.

Other aspects of this disclosure may relate to a motorcycle chassis comprising a steering mount structure at a front side, where the steering mount structure is configured to attach to a front wheel, a first structural member connected to and extending from a rear end of the steering mount structure to a front end of an electronics housing, a second structural member connected to and extending from the rear end of the steering mount structure to the front end of the electronics housing, where the first structural member is on a first side of the chassis and the second structural member is on a second side of the chassis opposite the first side. The chassis may also have a battery housing connected to and positioned below the first and second structural members, where the battery housing is configured to contain at least one battery, where a storage compartment is formed above the battery housing and between the first structural member and the second structural member. The storage compartment may form an enclosed volume, where the storage compartment includes a bottom surface formed by a top surface of the battery housing, a first side surface formed by an inner surface of the first structural member, a second side surface formed by an inner surface of the second structural member, a rear surface formed by a forward surface of the electronics housing, and a top surface formed by a storage compartment cover. The enclosed volume of the storage compartment may be within a range of 30 liters and 60 liters. The battery housing may comprise a first side member and a second side member opposite the first side member, where the first side member and the second side member when connected together form a hollow interior. An exterior surface of the battery housing may be exposed. The electronics housing may contain electrical component, such as a charging port, where the charging port is accessed by opening a bodywork door, by opening the storage compartment cover, or by lifting a seat or a portion thereof. The storage compartment may be accessed by opening a storage compartment cover positioned in front of a seat. The battery housing may also contain a battery management system, a DC/DC converter, and a charging member. In some embodiments, the storage compartment may have a fitted liner inserted between the first structural member and the second structural member. The first structural member and the second structural member may be beams with a C-shaped cross-section. In other embodiments, the first structural member and the second structural member that may be formed from tubes welded together.

Still other aspects of this motorcycle chassis may further comprise a swingarm connected to the electronics housing, where the swingarm extends rearward of the electronics housing and is configured to support a rear wheel, and where the electronics housing is connected to a rear surface of the battery housing. The battery housing may include an environmental seal. The top surface of the battery housing may have a pair of extensions protruding vertically from the top surface, where a first extension of the pair of extensions engages and connects to the first structural member and a second extension of the pair of extensions engages and connects to the second structural member.

Additional aspects of this disclosure may relate to a saddle type vehicle chassis comprising a steering mount structure at a front side, where the steering mount structure is configured to attach to a front wheel, a first structural member connected to and extending from a rear end of the steering mount structure to a front end of an electronics housing, a second structural member connected to and extending from the rear end of the steering mount structure to the front end of the electronics housing, where the first structural member is on a first side of the chassis and the second structural member is on a second side of the chassis opposite the first side, a battery housing connected to and positioned below the first and second structural members, wherein the battery housing is configured to contain at least one battery, wherein the battery housing includes a front wall, a rear wall opposite the front wall, a top wall extending rearward from the front wall, a bottom wall extending rearward from the front wall opposite the top wall, a first side wall extending between the top wall and the bottom wall, and a second side wall extending between the top wall and the bottom wall opposite the first side wall; wherein the electronics housing is connected to the rear wall of the battery housing. The chassis may further comprise a swingarm connected to the electronics housing, where the swingarm extends rearward of the electronics housing and is configured to support a rear wheel; and a storage compartment formed above the battery housing and between the first structural member and the second structural member, where the storage compartment forms an enclosed volume, and wherein the storage compartment includes a bottom surface comprising a top surface of the battery housing, a first side surface formed by an inner surface of the first structural member, a second side surface formed by an inner surface of the second structural member, a rear surface formed by a forward surface of the electronics housing, and a top surface formed by a storage compartment cover. Each of the first structural member and the second structural member may have a substantially C-shaped cross-section. The top wall of the battery housing has a pair of extensions protruding vertically above the top wall, wherein a first extension of the pair of extensions engages and connects to the first structural member and a second extension of the pair of extensions engages and connects to the second structural member. The enclosed volume of the storage compartment is within a range of 30 liters and 60 liters. A seat support structure may be connected to the electronics housing.

This disclosure may have further aspects related to a structural frame for a saddle type vehicle comprising a steering mount structure at a front side of the frame, where the steering mount structure is configured to attach to a front wheel, a first structural member connected to and extending from a rear end of the steering mount structure to a front end of an electronics housing, a second structural member connected to and extending from the rear end of the steering mount structure to the front end of the electronics housing, where the first structural member is on a left side of the frame and the second structural member is on a right side of the frame. The structural frame may also include a battery housing connected to and positioned below the first and second structural members, where the battery housing is configured to contain at least one battery. The battery housing may include a front wall, a rear wall opposite the front wall, a top wall extending rearward from the front wall, a bottom wall extending rearward from the front wall opposite the top wall, a left side wall extending between the top wall and the bottom wall, and a right side wall extending between the top wall and the bottom wall opposite the left side wall; where the electronics housing is connected to the rear wall of the battery housing and where the front wall, the left side wall, and the right side wall have exposed portions. The structural frame may include a swingarm connected to the electronics housing, wherein the swingarm extends rearward of the electronics housing and is configured to support a rear wheel.

Additional aspects of this disclosure may relate to a saddle type vehicle that includes a battery housing connected to and positioned below first and second structural members, where the battery housing contains at least one electrical energy storage device such as a battery or capacitor; a first storage compartment formed above the battery housing and between the first structural member and the second structural member, where the first storage compartment includes a cover and a first locking mechanism that has a first locked configuration and a first unlocked configuration. The saddle type vehicle may also include a seat positioned rearward of the first storage compartment, where a quick charge electrical port may be located under the seat. The seat may include a second locking mechanism that has a second locked configuration and a second unlocked configuration. When the second locking mechanism is in the second unlocked configuration, the seat may be moved rearward allowing the quick charge electrical port to be accessible. The second locking mechanism includes a first seat locking assembly that controls a first unlocked stage and a second seat locking assembly that controls a second unlocked stage, where the first unlocked stage may allow access to the quick charge electrical port, and the second unlocked stage may allow access to the quick charge electrical port and a second storage compartment located underneath the seat. When the first seat locking assembly is unlocked, the seat may be allowed to slide a predetermined distance rearward to provide access to the quick charge electrical port. The first seat locking assembly may include a first seat latch solenoid, a first seat latch, and a first seat actuator, where the first seat latch engages the seat, and the first seat latch solenoid controls the first seat latch.

Another aspect of this disclosure may be related to when the first seat latch is moved from the second locked configuration to the first unlocked stage of the second unlocked configuration, the first seat latch may be released from the first seat latch solenoid, and the first seat actuator may push the seat along a plurality of rails to expose the quick charge electric port. In addition, when the second seat locking assembly is unlocked, the seat may be allowed to slide a distance greater than the predetermined distance to allow access to the second storage compartment. The second seat lock assembly may include a second seat latch, a second seat latch solenoid, a latching door releasably engaged to the second seat latch, where the latching door may releasably engage a front seat axle located a bottom surface of the seat, and a second seat actuator connected to the seat. When the second seat lock assembly is moved from the second locked configuration to the second unlocked stage of the second unlocked configuration, the second seat latch solenoid may release the seat second latch which releases the latching door, where the latching door may release the front seat axle. The second seat actuator may exert a force on the seat. The second seat actuator may cause the seat to rotate upwards around a pivot axis located near a rear end of the seat. The second locking mechanism is moved from the first locked configuration to the first unlocked configuration using a remote electronic device, such that the saddle type vehicle communicates wirelessly with the remote electronic device.

This disclosure may further relate to a saddle type vehicle with a first storage compartment that operates in a manner when the first locking mechanism is in the first unlocked configuration, the cover may rotate about a cover hinge axis to allow access to the first storage compartment. The first locking mechanism may include a storage latch pin, a storage latch solenoid, a storage actuator, a cover hinge, and a mounting plate. When the first locking mechanism is moved from the first locked configuration to the first unlocked configuration, the storage latch solenoid may release the storage latch pin and the storage actuator pushes on a hinge plate of the cover hinge to rotate the cover about the cover hinge axis. The first storage compartment may be moved from the first locked configuration to the first unlocked configuration using a remote electronic device, such that the saddle type vehicle communicates wirelessly with the remote electronic device.

This disclosure may also relate to an electric saddle type vehicle that includes a steering mount structure, where the steering mount structure is configured to attach to a front suspension; a first structural member connected to and extending from a rear end of the steering mount structure to a front end of an electronics housing; a second structural member connected to and extending from the rear end of the steering mount structure to the front end of the electronics housing, where the first structural member is on a first side of the electric saddle type vehicle and the second structural member is on a second side of the electric saddle type vehicle; a seat support structure connected to the electronics housing; and a seat positioned above the seat support structure, wherein a quick charge electrical port is located below the seat, where the seat has a first locking mechanism that includes a first locked configuration and a first unlocked configuration. The first locking mechanism may include a first seat locking assembly that controls a first unlocked stage and a second seat locking assembly that controls a second unlocked stage, where the first unlocked stage allows access to the quick charge electrical port, and where the second unlocked stage allows access to the quick charge electrical port and a storage compartment located underneath the seat. When the first seat locking assembly is unlocked, the seat is allowed to slide a predetermined distance rearward to provide access to the quick charge electrical port. The first seat locking assembly may include a first seat latch solenoid, a first seat latch, and a first seat actuator, where the first seat latch engages the seat, and the first seat latch solenoid controls the first seat latch. When the first seat latch is moved from the first locked configuration to the first unlocked stage of the first unlocked configuration, the first seat latch may be released from the first seat latch solenoid, and the first seat actuator may push the seat along a plurality of rails to expose the quick charge electric port. The electric saddle type vehicle may further include a storage compartment formed above the battery housing, where the storage compartment includes a cover. The storage compartment may have a locking mechanism that has a locked configuration and an unlocked configuration, where the locking mechanism may include a storage latch pin, a storage latch solenoid, a storage actuator, a cover hinge, and a mounting plate. When the locking mechanism is moved from the locked configuration to the unlocked configuration, the storage latch solenoid may release the storage latch pin, and the storage actuator may push on a hinge plate of the cover hinge to rotate the cover upward about a cover hinge axis. The storage compartment is moved from the locked configuration to the unlocked configuration using a remote electronic device, such that the electric saddle type vehicle communicates wirelessly with the remote electronic device.

The disclosure may also relate to a saddle type vehicle chassis comprising: a first structural section mounting the front suspension and steering attached to a second structural section, where the second structural section includes a hollow shell module enclosing RESS components that connects and increase torsional stiffness and structure between the first structural section and a third structural member comprising a hollow shell electronics housing module which internally contains additional electronics components and mounts the rear suspension. A portion or an entirety of the second structural module may be exposed and styled cosmetically to also act as bodywork for the vehicle. Additionally, a portion or entirety of the third structural module may be exposed and styled cosmetically to also act as bodywork for the vehicle. The second structural module may contain battery cells, a battery management system, a DC/DC converter, and a charger. The second structural member may have a service disconnect mounted to it which shuts off the RESS energy from reaching any of its external electrical connections. In some examples, the second structural member may not be removed from the vehicle until the service disconnect is removed. The rear structure may have a quick charge port mounted in an upper region that can accessed from the top of vehicle by opening a bodywork door, by opening the storage compartment lid, or by lifting the seat or a portion of the seat. The quick charge port may be mounted in a separate charge port housing, which attaches to top of rear structure, and as such different types of charge ports can be mounted to the same rear structure for different markets where different charge ports may be being used. In addition, the top of third structural housing may form part of the rider seat support. The main rider seat support may be a single formed component and may also have an outer surface that is a styled portion of the exterior body shape. The rider seat may slide rearward and slightly upward on rails machined into rider seat support or attached to rider seat support. The rider seat may be rotated up and to the rear when it reaches the end of the sliding rails. The quick charge port and/or other components and storage under the rider seat may be accessed by the seat assembly sliding rearward. The seat assembly movement to access the charge port may include a mechanical spring, a gas spring, or an electric motor. The quick charge port and/or other components and storage under the seat may be accessed by sliding or rotating all or a portion of the seat assembly, where the seat assembly may be rotated about a hinge. A radiator for cooling the electric motor and/or RESS under the swingarm. The vehicle control module monitors the temperatures of the motor and/or RESS and may circulate coolant within the housings or other areas of the vehicle as required to maintain proper temperatures of the motor or RESS. The vehicle may also include passenger handholds that have turn signals integrated into the handholds.

Still other aspects of the disclosure may relate to a saddle type vehicle chassis comprising: a first hollow shell type structural module mounting to the front suspension and steering apparatus, where first hollow shell type structural module may enclose electrical components attached to a second structural section, where the second structural section may be a hollow shell module enclosing RESS components. The second structural section may connect and increase torsional stiffness between the first hollow shell type structural module and a third structural member comprising a hollow shell electronics housing module, where the electronics housing module internally contains additional electronics components and mounts the rear suspension. A portion of or all of the second structural module may be exposed and styled cosmetically to also act as bodywork for the vehicle. A portion of or all of the third structural module may be exposed and styled cosmetically to also act as bodywork for the vehicle. The second structural module may contain battery cells, battery management system, DC/DC converter and charger. The second structural module may have a service disconnect mounted to it which shuts off the RESS energy from reaching any of its external electrical connections. The service disconnect may need to be removed prior to removing the second structural member from the vehicle. A quick charge port may be mounted to a top of the rear structure, and the quick charge port may be accessed from a top of the vehicle by opening a bodywork door, by opening the storage compartment lid, or by lifting the seat or a portion of the seat. The quick charge port may be mounted in a separate charge port housing which attaches to a top of the rear structure, where different types of charge ports may be mounted to the same rear structure for different markets where different charge ports may be being used. A top portion of the third structural housing may form part of the rider seat support. A primary rider seat support may be formed from a unitary component, wherein the primary rider seat support may have an outer surface that forms a portion of the styled body shape. The seat may slide rearward and slightly upward on rails machined into the rider seat support or attached to the rider seat support. The rider seat can be rotated up and to the rear when it reaches the end of the sliding rails. The quick charge port and/or other components and storage under the rider seat may be accessed by the seat assembly sliding rearward. The seat assembly movement may allow access to the charge port and may include a mechanical spring, a gas spring, or an electric motor. The quick charge port and/or other components and storage area under the seat may be accessed by all or a portion of the seat assembly when the seat assembly rotates open on a hinge. The rotation mechanism of the seat may include by a mechanical spring, a gas spring, or an electric motor. A radiator for cooling the electric motor and/or RESS may be mounted under the swingarm. The vehicle control module may monitor the temperatures of the electric motor and/or RESS and circulate coolant as required to maintain proper temperatures of these components.

Additional aspects of disclosure may relate to a saddle type vehicle rear suspension comprising: a rear suspension arm with a forked front section where the swingarm fork encloses a hollow chassis structural member containing electronics which descends past the swingarm pivot axis. The swingarm fork may rotate for suspension movement about a front axis on bearings that are mounted in bosses protruding separately from a hollow chassis structural member. The swingarm axis pivot bearings may be retained from axial movement in their housings by the footpeg mounts. The swingarm pivot may be via separate left and right stub axles which fit inside the swingarm bearings and attached by bolts to the swingarm.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
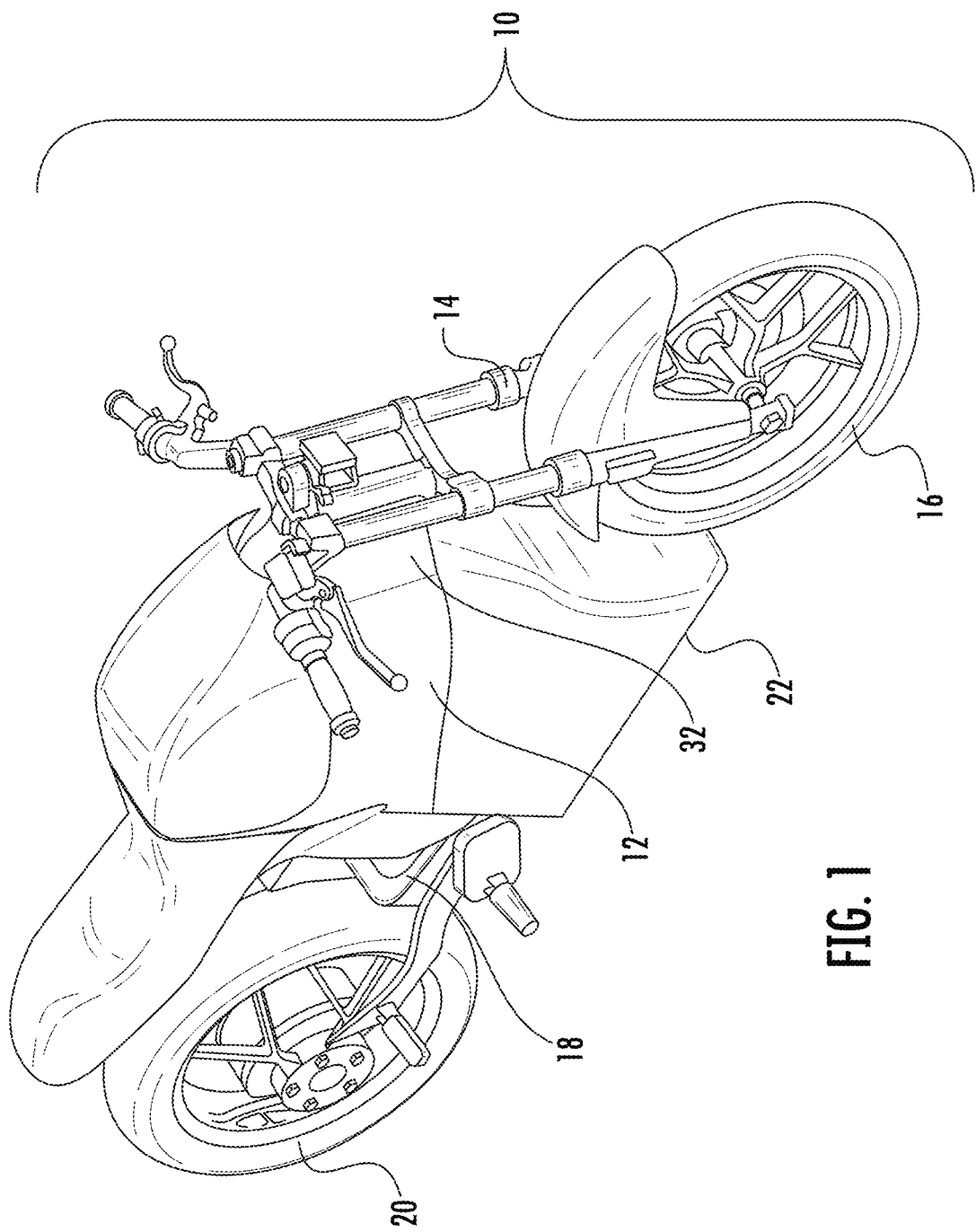
FIG. 1 illustrates a top front perspective view of an electric saddle type vehicle chassis according to aspects disclosed herein.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "attached," "fixed," "connected," "coupled," "positioned," "engaged" and similar terms, is meant to include both direct and indirect mounting, attaching, fixing, connecting, coupling, positioning and engaging.

Also, while the terms "top," "bottom," "front," "back," "left," "right," "side," "rear," "upward," "downward," and the like may be used in this specification to describe various example features and elements of the disclosure, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three-dimensional orientation of structures in order to fall within the scope of this disclosure. Also, the reader is advised that the attached drawings are not necessarily drawn to scale.

In general, this disclosure relates to an electric motorcycle, or saddle type vehicle, chassis that provides a large volume easy access dry storage for daily commuter/shopper use, while also providing as large battery capacity combined with an easy access port for quick recharging of the batteries.

In addition, this disclosure may relate to a saddle type vehicle chassis comprising two or more modules containing electrical components wherein the modules are themselves essential structural components of the chassis. Within this aim is that such modules may have different internal content within the same external shell design depending on price/performance goals, thus allowing the outer shells to be used in different vehicle models. Within this aim, different outer shell shapes may be utilized, but with similar attachment points, again allowing a wider range of products for different uses that share modules as chassis building blocks. A further objective is to have the chassis modules contain the high voltage electrical components in a sealed state within the modules, while using the outer shells of the modules as the load bearing members of the chassis. Access to the electrical components can be designed such that special tools are necessary to open the modules thus preventing accidental contact from a non-professional technician. In addition, the outside surfaces of these modules may serve as visual body components reducing costs and weight. Some of the examples saddle type vehicles disclosed may comprise at least one RESS contained inside a structural shell module which is a load bearing portion of the main chassis, and at least one additional structural shell module which is a load bearing portion of the chassis and which contains electrical components and attaches to the RESS containing module through an interface.

As shown in the embodiment of FIGS. 1-4, the motorcycle chassis 12 may include a front steering mount structure 32 connected to a first structural member 24 on a first side of the chassis 12 and a second structural member 26 on a second side opposite the first structural member 24 opposite the first side of the chassis 12. The first and second structural members 24, 26 may be spaced apart from each other and may have portions that are substantially parallel to each other. In some embodiments the structural members 24, 26 may have a curved shape such that they converge toward each other near the front structure 32. The structural members 24, 26 may have a narrow width and tall height, such that the height may be greater than the width and comprise the left and right sides of the chassis 12 of the motorcycle 10. For instance, the structural members 24, 26 may have a cross-sectional profile where a ratio of the height to the width may be of approximately 6:1, or within a range of 4:1 and 8:1, or within a range of 3:1 and 10:1. A battery housing 22 may be connected to the structural members 24, 26 and may be positioned below structural members 24, 26. The battery housing 22 may be configured to contain a rechargeable electric energy storage system ("RESS"), which may include an electrical energy storage device, such as a battery or battery capacitor, and battery management system. The battery housing may also include a DC/DC converter and a charging member. The motorcycle 10 may include at least one hub electric motor that is connected to the battery or RESS. A storage compartment 100 may be formed above the battery housing 22 and between the first and second structural members 24, 26. The battery housing 22 may include hollow interior and may be attached to a bottom surface of said side members, (first and second structural members 24, 26) in multiple locations. The battery housing 22 and side members 24, 26 may be attached to a rear structural electronics housing 34, which may have a swingarm 18, the rear suspension 19, a rider seat support structure 17, and seat 28. In some embodiments, the battery housing 22 may be mounted to the front structure 32.

FIG. 1 illustrates a motorcycle 10 having the chassis 12. The chassis 12 may define the frame structure comprising the front structure 32 and the thin walled dual beam upper center structure 24, 26. The front structure 32 may connect to the front telescoping fork 14, or front suspension, that may bear front wheel 16 at the front end of the motorcycle 10. In addition, the frame structure may include the rear structure 34. The swingarm 18 may mount to the rear structure 34, where the swingarm 18 may bear rear wheel 20. Battery housing 22 may be attached in multiple locations beneath the structural members 24, 26 and/or between the substantially parallel beam members 24, 26 of dual beam frame structure. The battery housing 22 may also be attached in multiple locations to rear structure 34. The battery housing 22 may act as a structural reinforcement to help stiffen the chassis 12. Because the batteries, or RESS, may comprise a large percentage of the weight of the motorcycle 10, positioning battery housing 22, and the enclosed batteries, beneath the structural members 24, 26 helps to position the overall center of gravity of the motorcycle 10 in a low and forward position, which may improve handling and control of the motorcycle 10.

Figure 2:
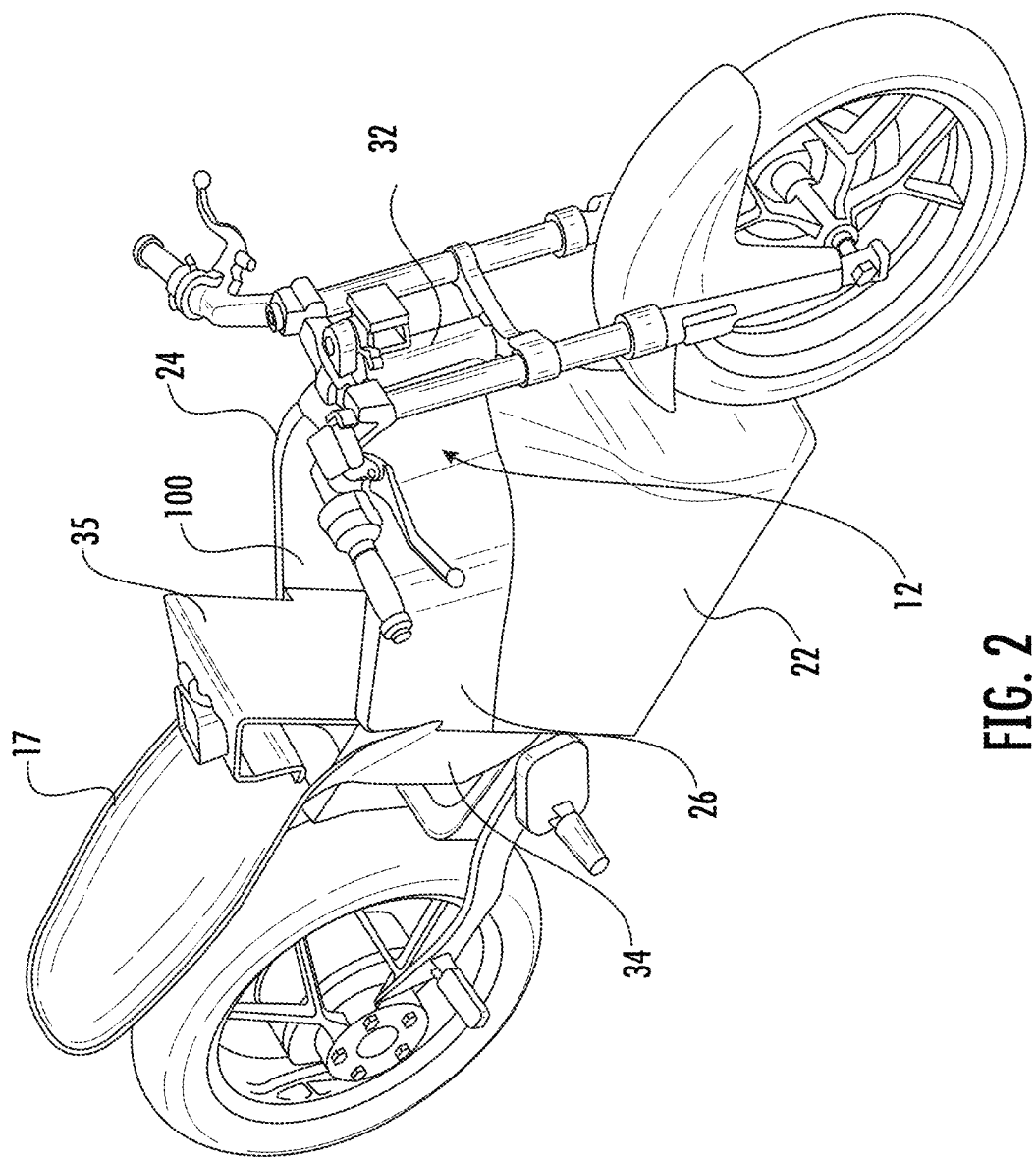
FIG. 2 illustrates a top front perspective view of the electric a saddle type vehicle chassis of FIG. 1 with the seat and cover removed for clarity according to aspects disclosed herein.
Figure 3:
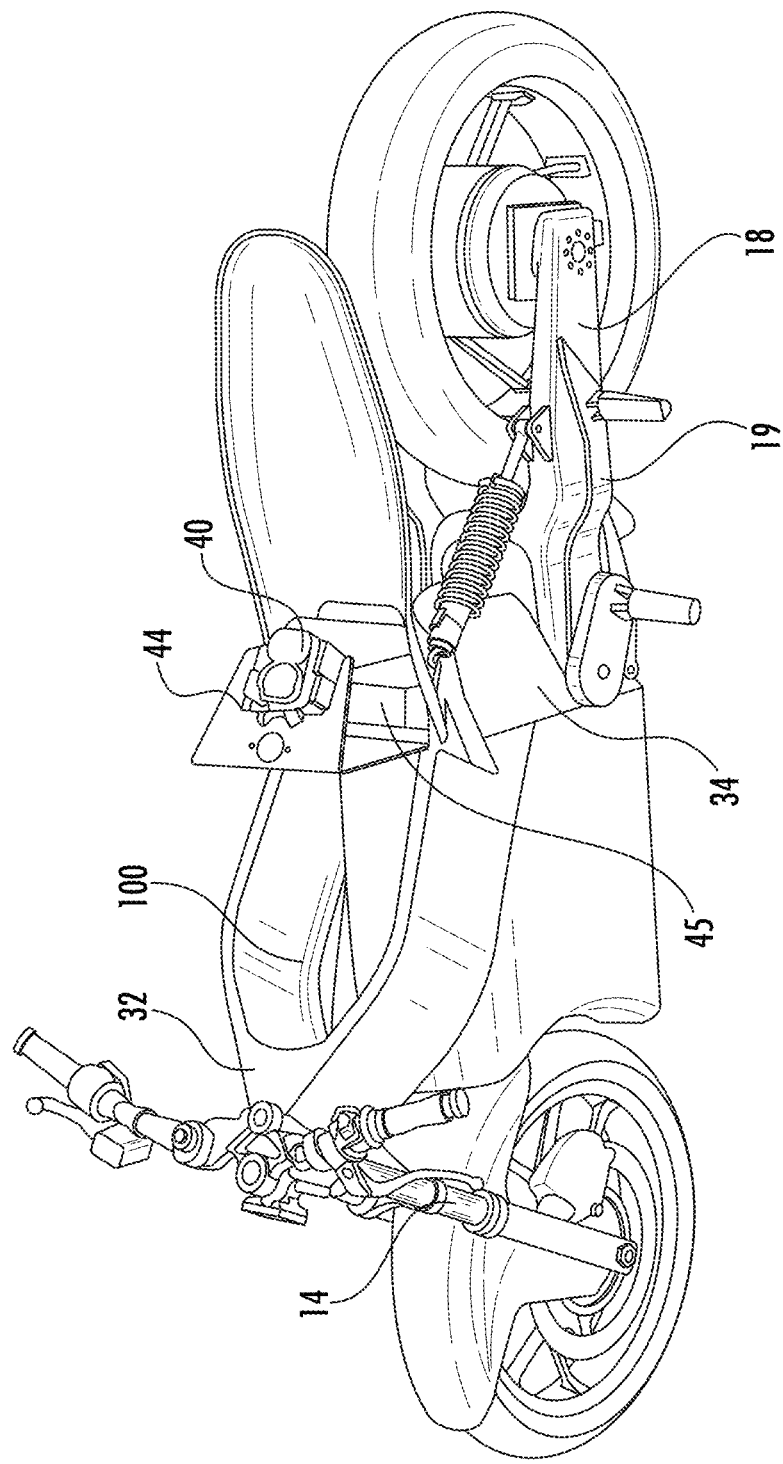
FIG. 3 illustrates a top side perspective view of the electric saddle type vehicle chassis of FIG. 1 with the seat and cover removed for clarity according to aspects disclosed herein.
Figure 4:
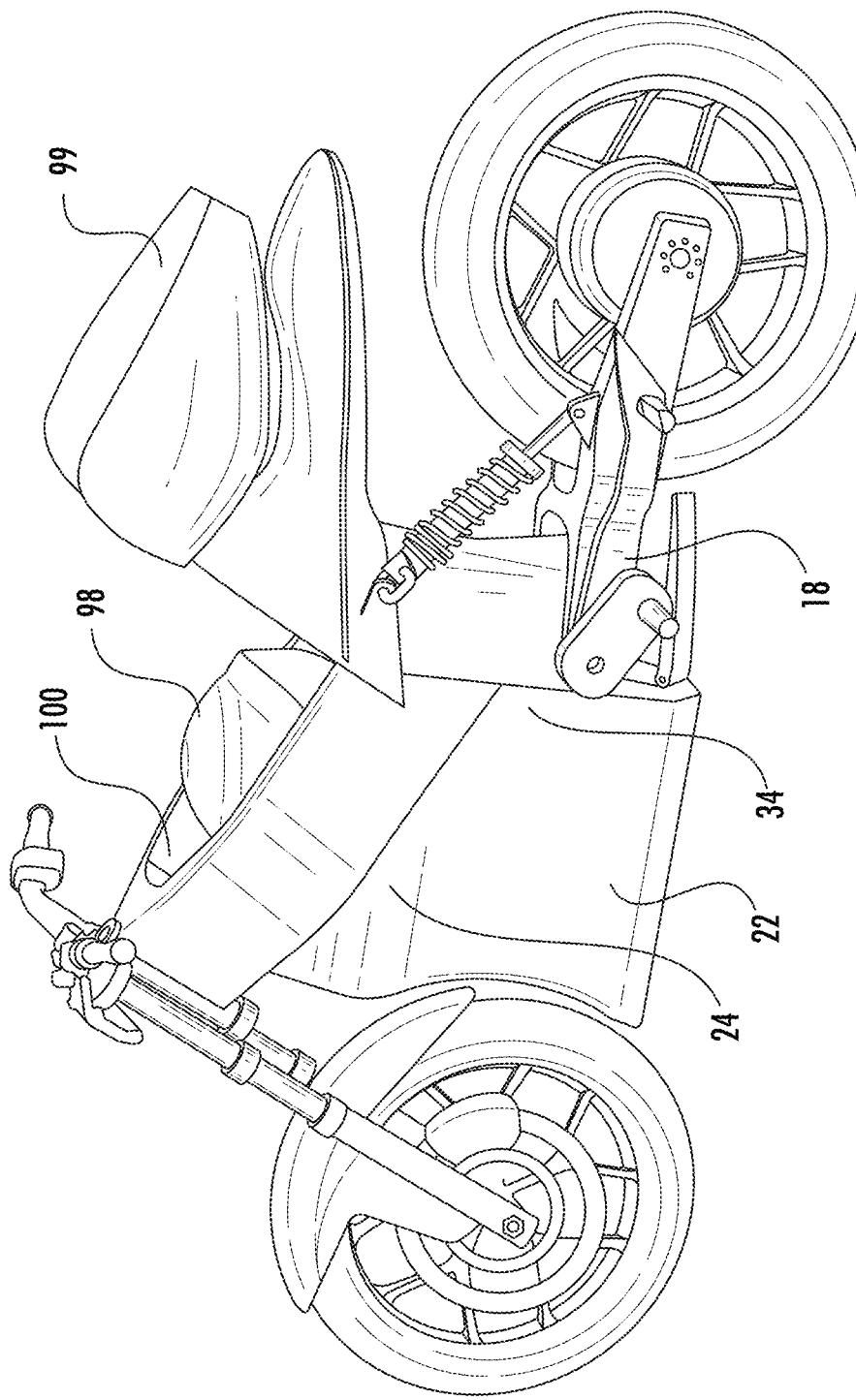
FIG. 4 illustrates a side perspective view of the electric saddle type vehicle chassis of FIG. 1 with the cover opened according to aspects disclosed herein.

As seen in FIGS. 2 and 3, a storage compartment 100 may be formed above battery housing 22 between structural members 24, 26. The storage compartment 100 may have a bottom surface formed by a top surface of battery housing 22, a left side surface formed by an inner surface of first beam member 24 and a right side surface formed by an inner surface of beam member 26, a rear surface may be formed by a forward surface of the electronics housing 34, and a top surface formed by an inner surface of cover 99. The battery housing 22 may add torsional and bending stiffness to the chassis 12, which may eliminate the need for any additional structure between frame rails 24, 26. This structure also may allow for a dry storage compartment 100 that can form an enclosed volume capable of holding large objects such as helmet 98 shown in FIG. 4. The volume of the storage compartment 100 may be approximately 50 liters, or may be within a range of 30 liters and 60 liters. Further, the storage compartment may have a vertical interior height at least 12 inches. The storage compartment cover 99 may be rotatably attached or hinged in front of the seat 28 such that when opened provides access to the storage compartment 100.

Figure 5:
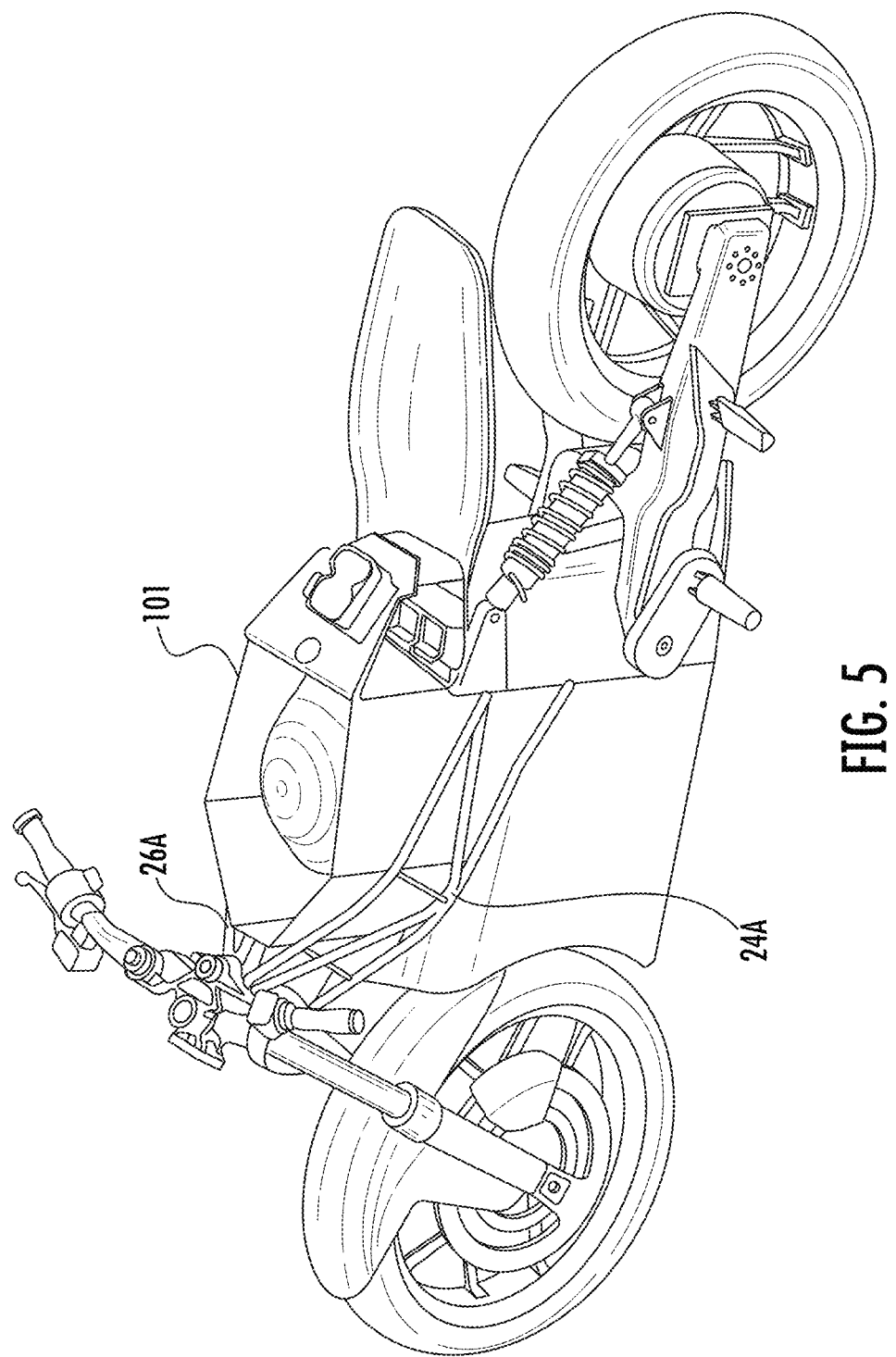
FIG. 5 illustrates a top side perspective view of an alternate embodiment of the electric saddle type vehicle chassis of FIG. 1 with the seat and cover removed for clarity according to aspects disclosed herein.

Each of beam members 24 and 26 may be attached at their front end to front structure 32 which supports the front suspension 14. The front structure 32 may be substantially V-shaped and include a receiver, or forward opening, for the front suspension 14 and a rear end with a pair of engaging members. Each of the structural members 24, 26 may be beams that have a substantially C-shaped cross-sectional shape, or alternatively, as shown in FIG. 5, the structural members 24, 26 may be formed from welded tubular side beam members 24A and 26A. In some embodiments, the storage compartment 100 may include an inner liner 101 to better define the enclosed dry storage volume 100.

The rear structure 34 may be in the form of a box-like casting, where the swingarm 18 and seat support structure 17 attach to the rear of the rear structure 34. As seen in FIG. 3 rear shock absorber 19 may be attached at one end to swingarm 18 and on the other end to rear structure 34. The rear structure 34 may be provided with a front cover plate 35. The electric motor controller 45 and other electronic components may be mounted to the front cover plate 35. Other electrical components may be contained in the interior of rear structure 34, such as a high voltage relay.

The rear of battery housing 22 may be attached at the front of electronic housing 34, and the top wall of battery housing 22 may be attached to the bottom of beams 24 and 26. In some embodiments, the top front portion of the battery housing 22 may be connected to the front structure 32. Rear structure cap 44 may be mounted on top of rear structure 34 and include a quick charge port 40 which connects to the high voltage ground and to an electrical contact or similar component inside the electronics housing 34.

Figure 6:
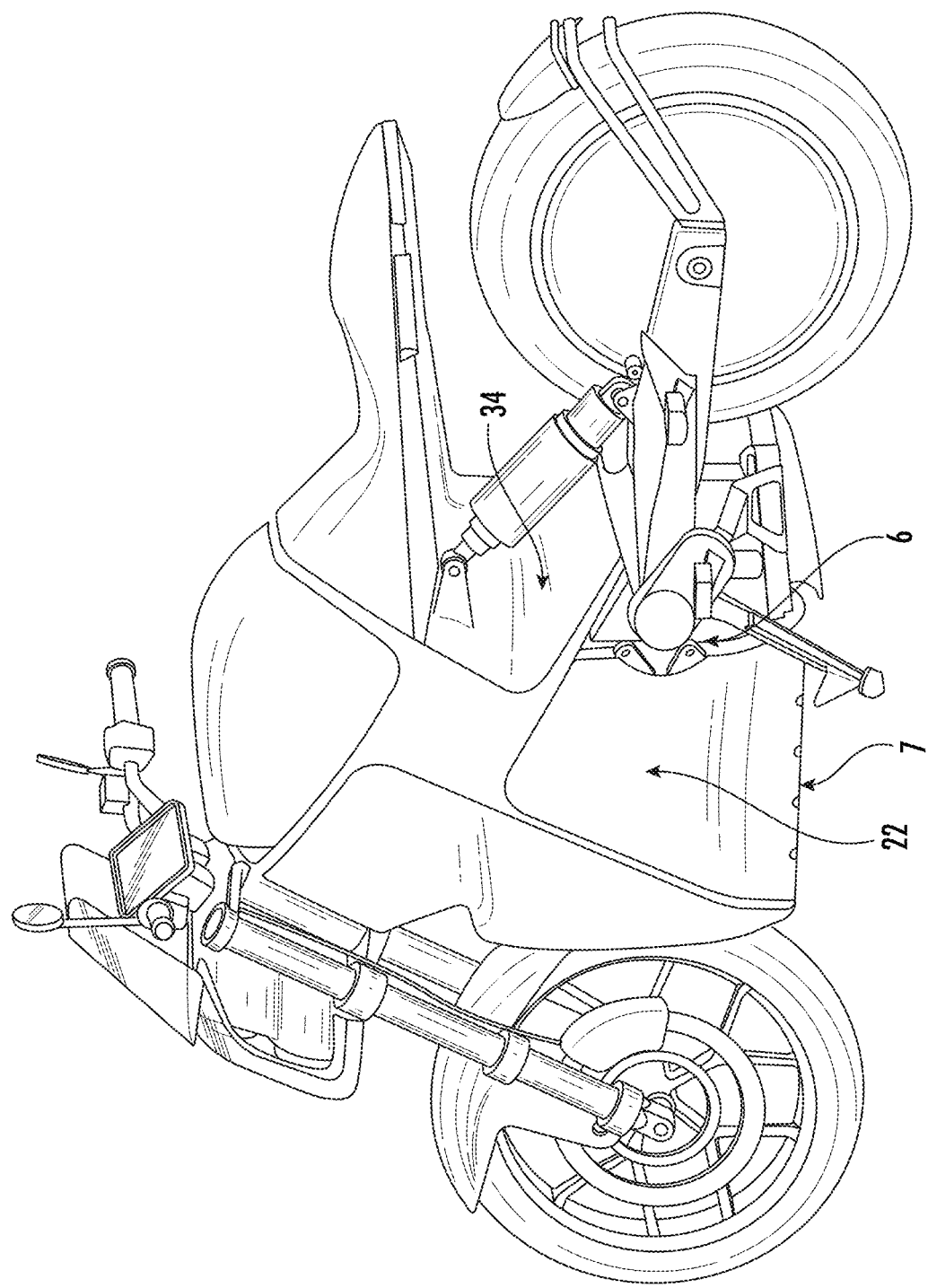
FIG. 6 illustrates a side perspective view of an alternate embodiment of the electric saddle type vehicle chassis of FIG. 1 according to aspects disclosed herein.
Figure 7:
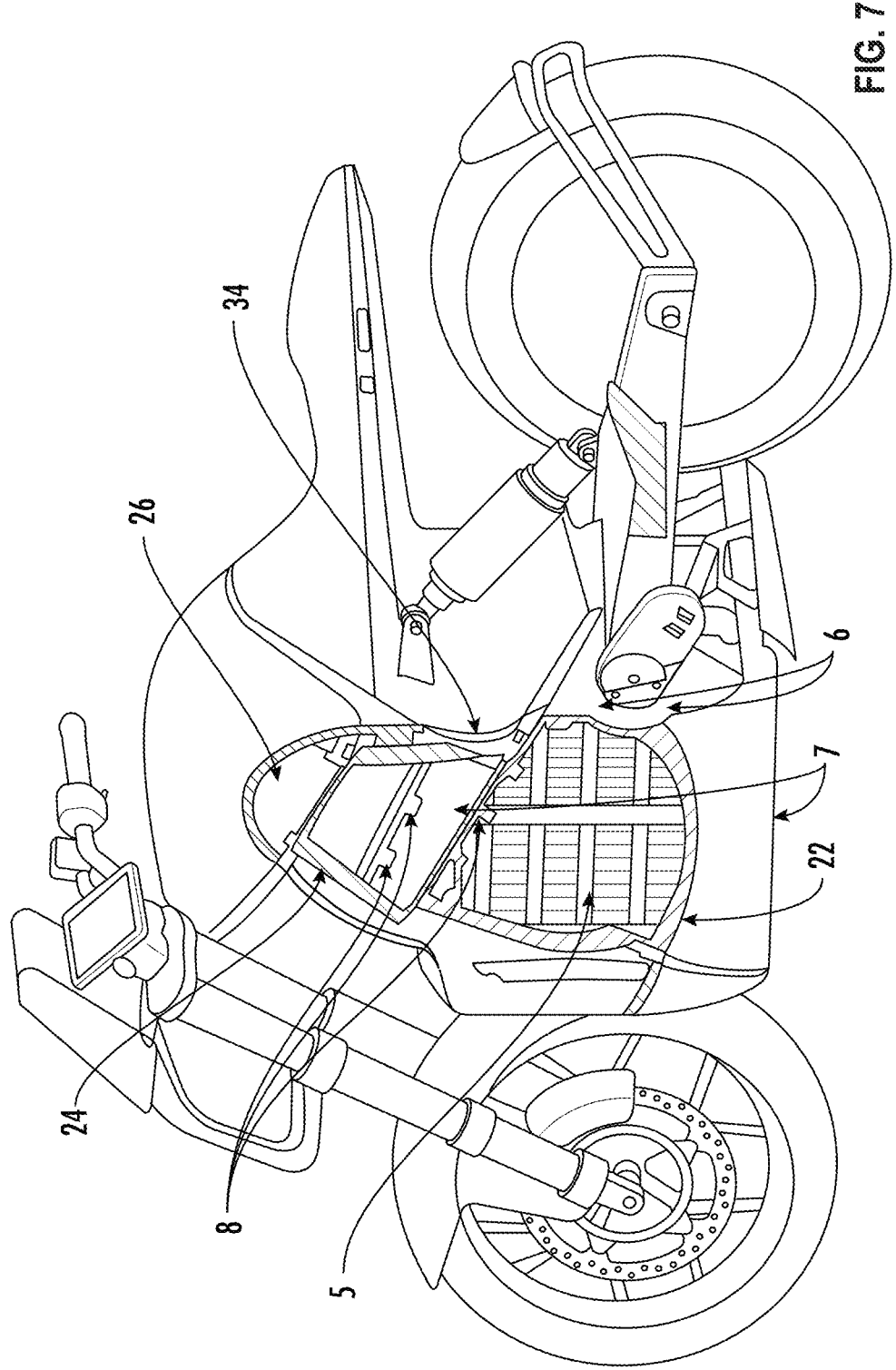
FIG. 7 illustrates a partial cross-sectional view of the electric saddle type vehicle chassis of FIG. 6 according to aspects disclosed herein.
Figure 8:
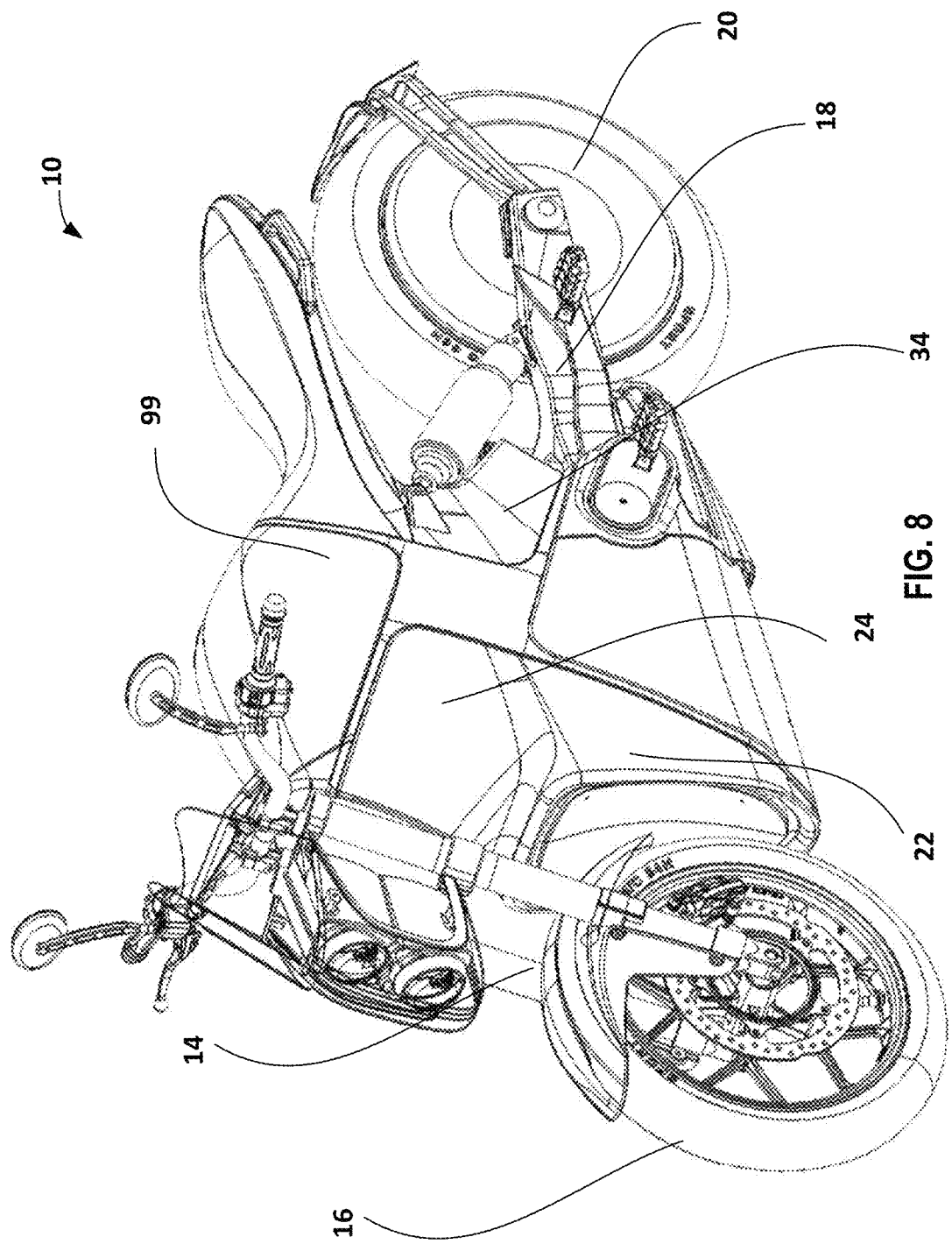
FIG. 8 illustrates a front perspective view of the electric saddle type vehicle chassis of FIG. 6 according to aspects disclosed herein.
Figure 9:
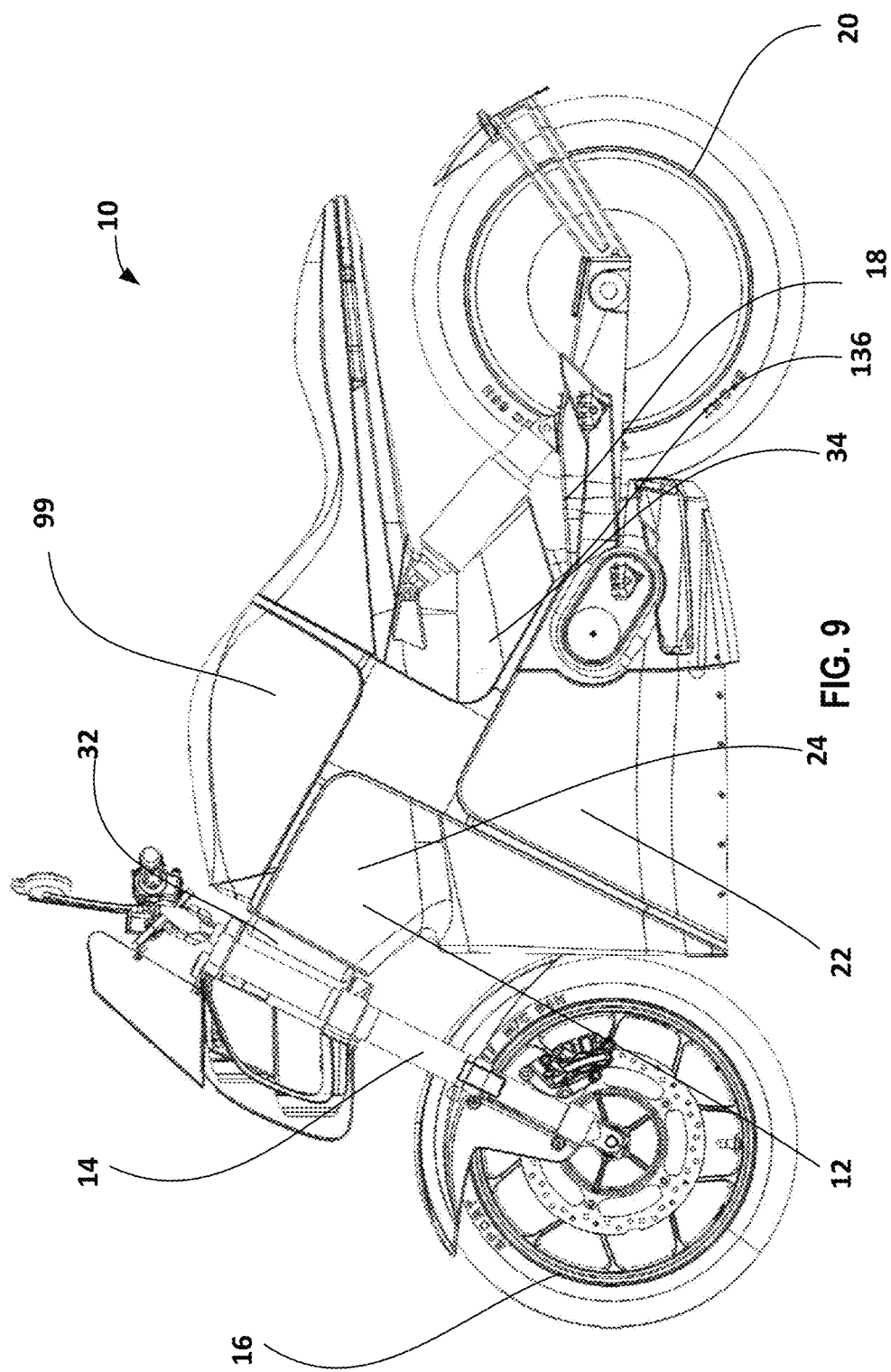
FIG. 9 illustrates a side view of the electric saddle type vehicle chassis of FIG. 6 according to aspects disclosed herein.
Figure 10:
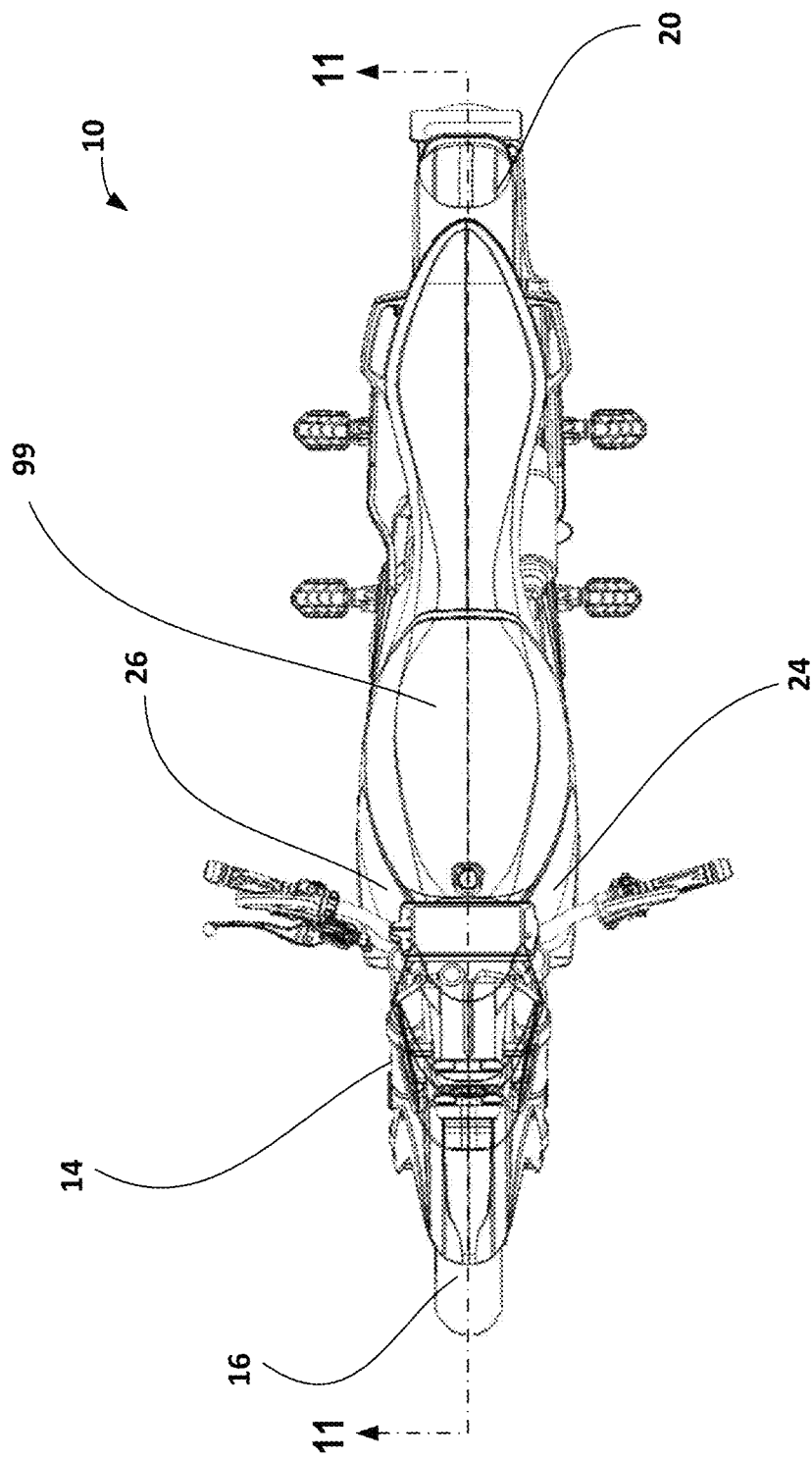
FIG. 10 illustrates a top view of the electric saddle type vehicle chassis of FIG. 6 according to aspects disclosed herein.

FIGS. 6-11 illustrate an embodiment of the motorcycle with chassis 12 described above. The structural members 24, 26, the battery housing 22, and the electronics housing 34 may be attached to each other with a plurality of mechanical connections. For example, the mechanical connections may be a plurality of mechanical fasteners, such as screws, or similar fasteners known to one skilled in the art. The fasteners may have a drive mechanism to ensure they are tamper proof to prevent any removal by an end user. FIG. 6 shows an external view of a motorcycle embodiment showing some of the attachment locations 6 where battery housing 22 is fixed to rear structure 34. In addition, as will be discussed in more detail below, a portion of the attachment locations 7 for the mechanical connections between the first side member 110 and the second side member 112 of the battery housing 22 may be along a longitudinal centerline of the motorcycle 10. FIG. 7 shows a partial cutaway view of the vehicle shown in FIG. 6. Battery cell pack 5 is visible as enclosed in battery housing 22. Internal attachment locations 7 between side members 110, 112 of battery housing 22 are seen, as well as a portion of attachment locations 8 of the mechanical connections that attach the battery housing 22 to the structural members 24, 26 to the top of battery housing 22.

The structural frame 12 may provide the required stiffness and strength to carry the structural loads efficiently from the steering mount structure 32 through the structural members 24, 26 and then through both battery housing 22 and electronics housing 34. In other words, the load path from tire to road forces may travel and be carried from the steering mount structure 32 through the structural members 24, 26 and then through both battery housing 22 and electronics housing 34, and the chassis structure may prevent deflection of the wheels relative to the center of gravity under lateral, longitudinal and vertical loads. For example, the structural frame 12 may have adequate stiffness and strength to prevent the frame from twisting under normal loading conditions such that the front wheel and rear wheel remain substantially coplanar when the vehicle receives up to a three g force in either a lateral, longitudinal, or vertical direction. With respect to this loading, substantially coplanar is defined as a range +/−5 degrees of being coplanar. As shown in the cross-sectional view of FIG. 11, the rear end of the steering mount structure 32 may be attached to the front end 129 of structural member 24 which may extend rearward and downward from the steering mount structure 32 to a rear end 130 attached to the front of the electronics housing 34. The swingarm 18, which supports the rear wheel 20, may connect to the rear end 136 of the electronics housing 34. The battery housing 22 may be located beneath the structural member 24 and in front of the electronics housing 34. The battery housing 22 may connect directly to a bottom surface the structural member 24 and the front surface of the electronics housing 34. The steering mount structure 32 may be integrally joined to the structural members 24, 26 such that separating the steering mount structure 32 from the structural members 24, 26 may damage the components. For example, the steering mount structure 32 may be welded, brazed, or adhesively joined to the structural members 24, 26.

Figure 11:
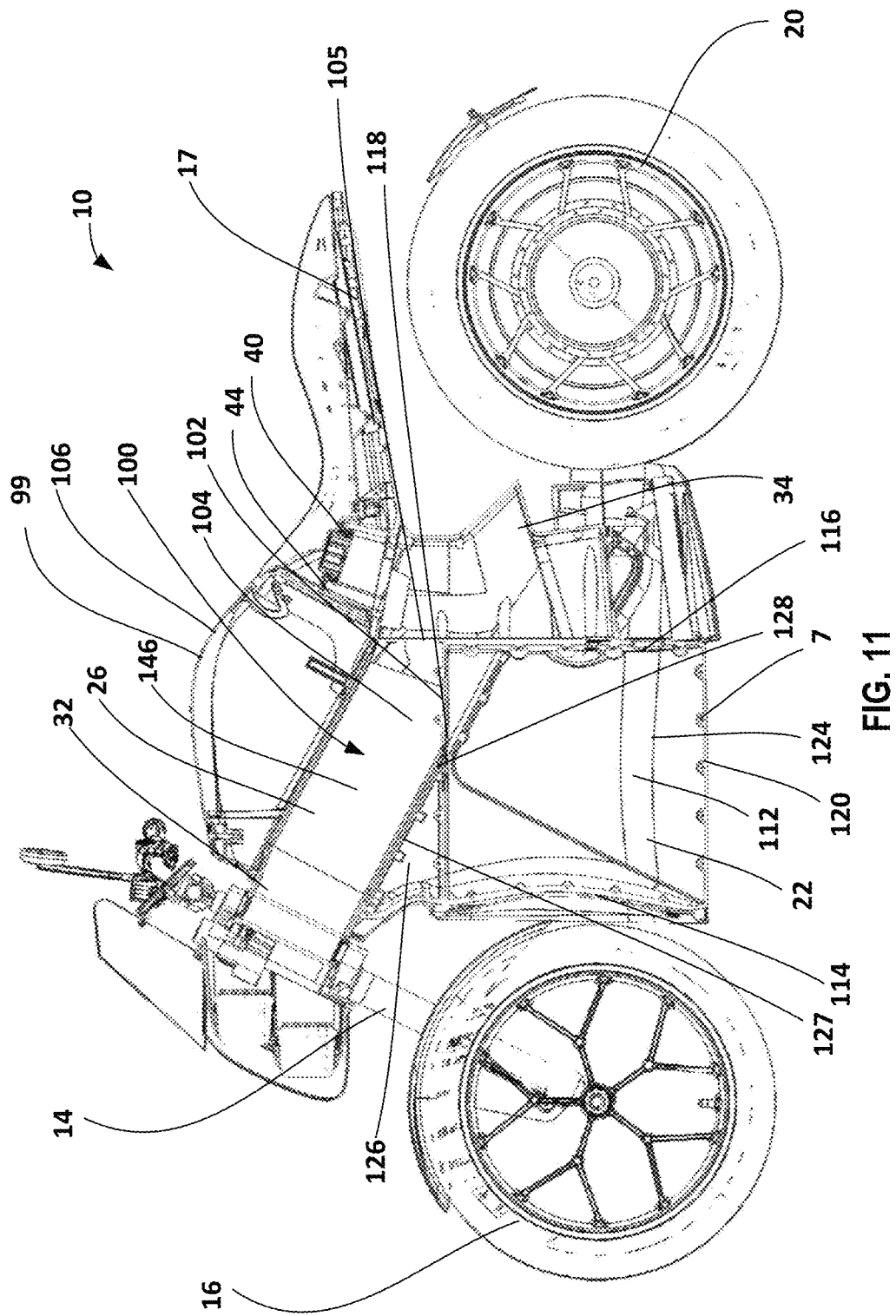
FIG. 11 illustrates a cross-sectional side view of the electric saddle type vehicle chassis of FIG. 10 according to aspects disclosed herein.

In addition, the storage compartment 100 may be seen in FIG. 11. The storage compartment 100 may have a bottom surface 102 formed by a top wall 118 of the battery housing 22, a first side surface 103 formed by inner surfaces 140 of the first structural member 24, a second side surface 104 formed by inner surfaces 146 of the second structural member 26, a rear surface 105 formed by a forward surface of the electronics housing, and a top surface 106 formed by the storage compartment cover 99. As another options, a portion of the first and second side surface 102 may be formed by inner surfaces 132 of the extensions 126.

The battery housing 22 may include a front wall 114, a rear wall 116 opposite the front wall 114, a top wall 118 extending rearward from the front wall 114, a bottom wall 120 extending rearward from the front wall 114 opposite the top wall 118, a first side wall 122 extending between the top wall 118 and the bottom wall 120, and a second side wall 124 extending between the top wall 118 and the bottom wall 120. The electronics housing 34 may be connected to the rear wall 116 of the battery housing 22. In addition, the battery housing 22 may have a pair of extensions 126 protruding vertically from the top wall 118, wherein a first extension 126A of the pair of extensions may engage and connect to the first structural member 24 and a second extension 126B of the pair of extensions 126 may engage and connect to the second structural member 26. The extensions 126 may have an angled top surface 127 and may extend from the top wall 118 at an intersection point 128 near a center of a rearward distance between the front wall 114 and the rear wall 116. Accordingly, the top surface 127 of the extension 126 may be spaced a greater distance away from the top wall 118 near the front of the battery housing 22 than at the intersection point 128. The extensions 126 may be arranged above the side walls 122, 124 such that the exposed outer side surfaces of the battery housing may be a smooth continuously contoured surface. The wall thickness of the extensions 126 may be similar or the same as the side wall thickness to provide an open space between the extensions 126 to help form the storage compartment 100 when attached to the structural members 24, 26. The top wall 118 and the top surfaces 127 of the pair of extensions 126 may directly connect to the structural members 24, 26.

Figure 12:
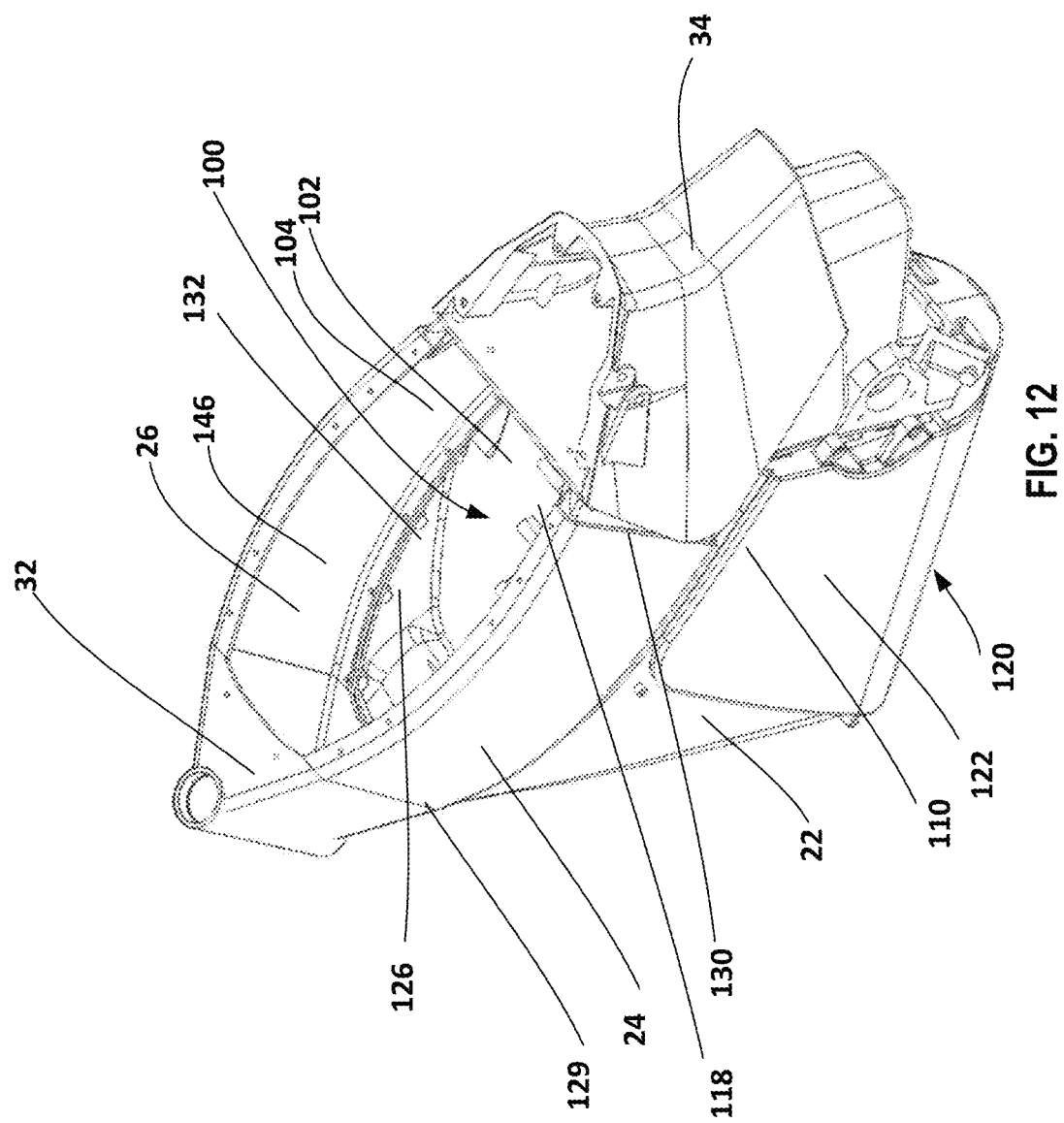
FIG. 12 illustrates an rear perspective view of the electric saddle type vehicle chassis of FIG. 6 with multiple part removed for clarity according to aspects disclosed herein.
Figure 14:
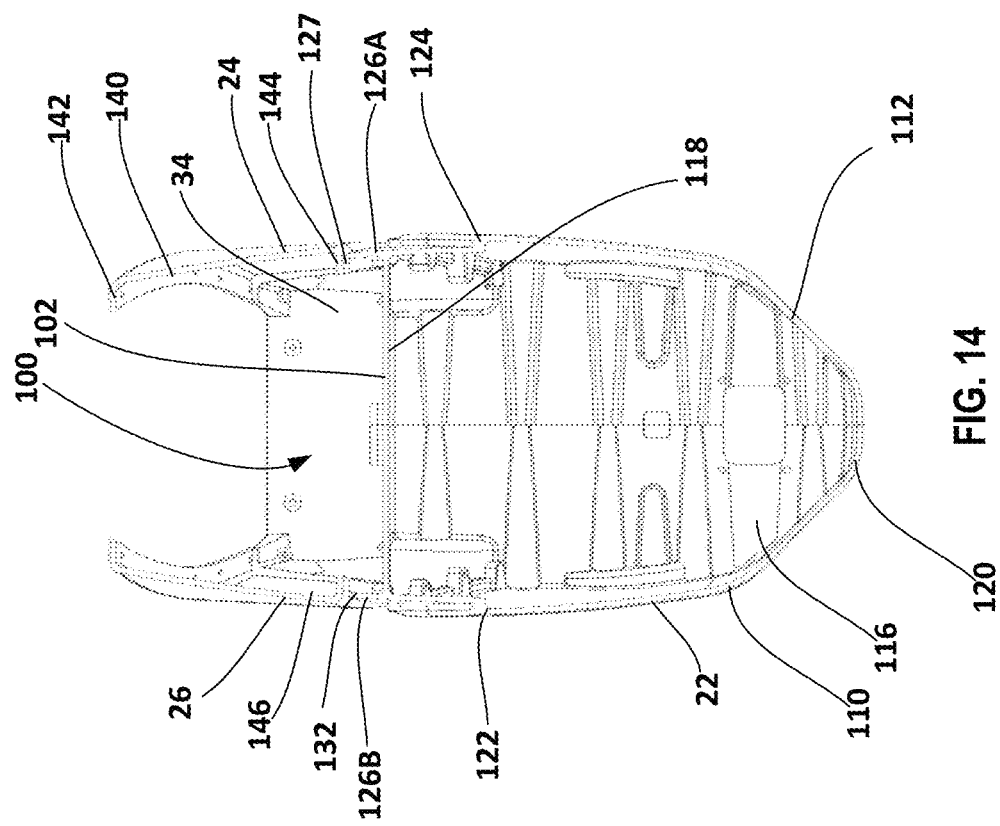
FIG. 14 illustrates a cross-sectional front view of the electric saddle type vehicle chassis components of FIG. 13 according to aspects disclosed herein.
Figure 13:
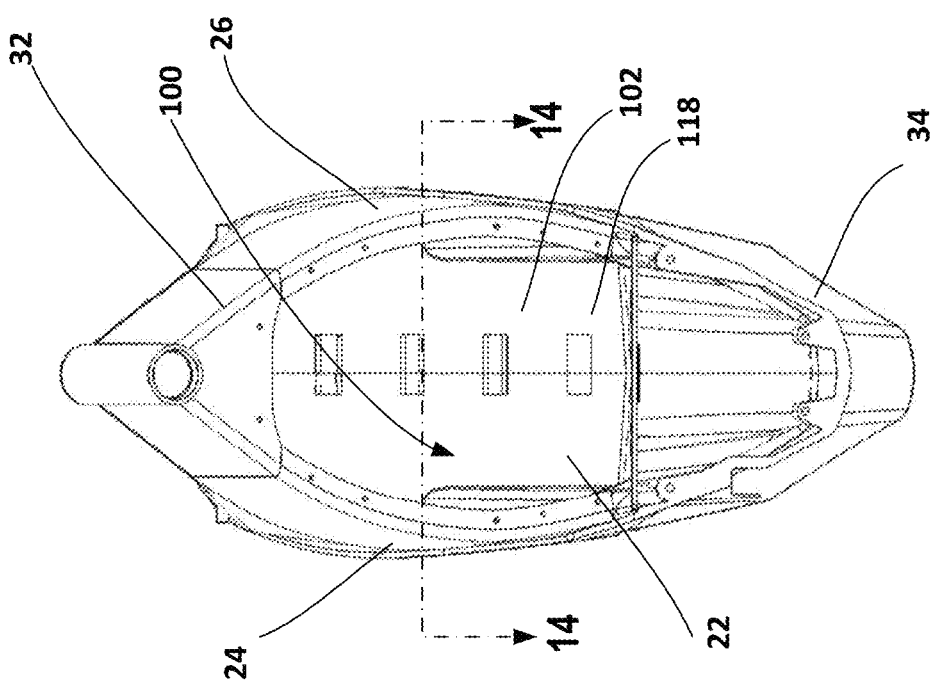
FIG. 13 illustrates a top view of the electric saddle type vehicle chassis components of FIG. 12 according to aspects disclosed herein.
Figure 15:
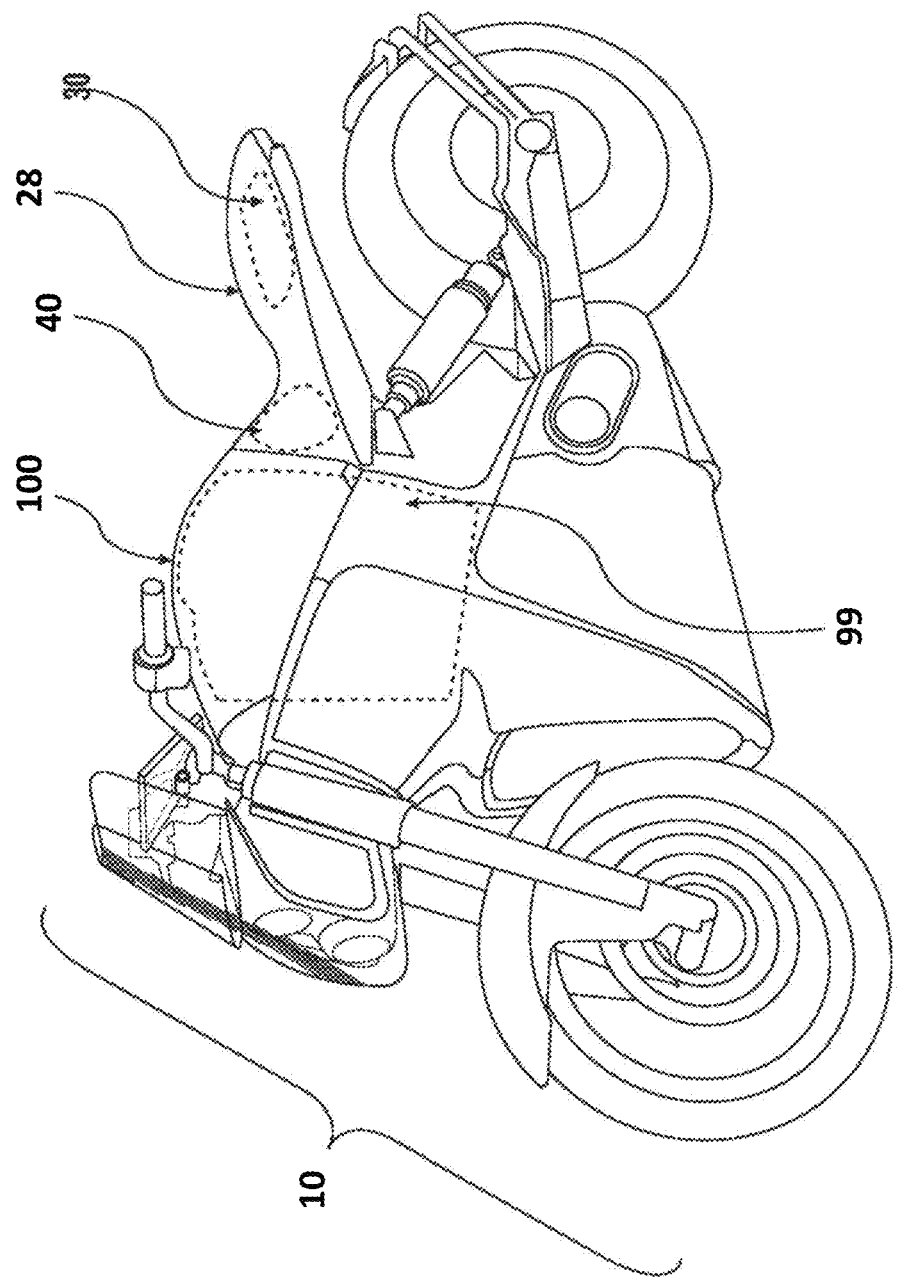
FIG. 15 illustrates a side perspective view of another example of a saddle type vehicle according to aspects disclosed herein.

FIGS. 12-14 illustrate the structure of the steering mount structure 32, the structural members 24, 26, the electronics housing 34, and the battery housing 22 in more detail. FIGS. 12-14 have all of the components removed except steering mount structure 32, the structural members 24, 26, the electronics housing 34, and the battery housing 22 to better illustrate this portion of the chassis 12. FIG. 12 shows the inside of the storage compartment 100 without the cover 99. In addition, FIG. 14 illustrates a cross-sectional view through the storage compartment 100 and battery housing 22. The inner side surfaces 103, 104 of the storage compartment 100 may be formed by extensions 126 and the inner surfaces 140, 146 of structural members 24, 26.

Further, the structural members 24, 26 may have a substantially C-shaped cross-section that includes an upper flange 142 and lower flange 144. The lower flange 144 may provide a mounting surface to the top surface 127 of the extensions 126. In addition, the bottom surface 102 of the storage compartment may be formed by an upper surface of the top wall 118.

The battery housing 22 may be formed from first side member 110 and second side member 112 and may be connected to each other along a longitudinal centerline of the motorcycle 10. Each side member 110, 112 may be formed as a unitary piece and may be formed from a metallic material using a casting, machining, forging, metal injection molding or other process known to own skilled in the art. In addition, the electronics housing 34 may be formed a unitary piece to may be formed from a metallic material using a casting, machining, forging, metal injection molding or other process known to own skilled in the art. Each of the structural members 24, 26 of the chassis 12 may also be formed as a unitary piece and formed from a metallic material using a casting, machining, forging, metal injection molding, extrusion, or other process known to own skilled in the art. While not limiting, metallic materials may be aluminum or aluminum alloy, magnesium or magnesium based alloy, a steel alloy, or other metallic material known to one skilled in the art. In some embodiments, the side members 110, 112 may be formed from a nonmetallic material such as carbon composite structure, or fiber-filled polymeric material. Alternatively, in some embodiments, the structural members 24, 26, electronics housing 34, and side members 110, 112 of the battery housing 22 may be formed from multiple components. In some embodiments, the battery housing 22 may include an environmental seal between the side members 110, 112 to help keep dust and moisture from entering the battery compartment. The seal may be formed from an elastomeric material.

Figure 20:
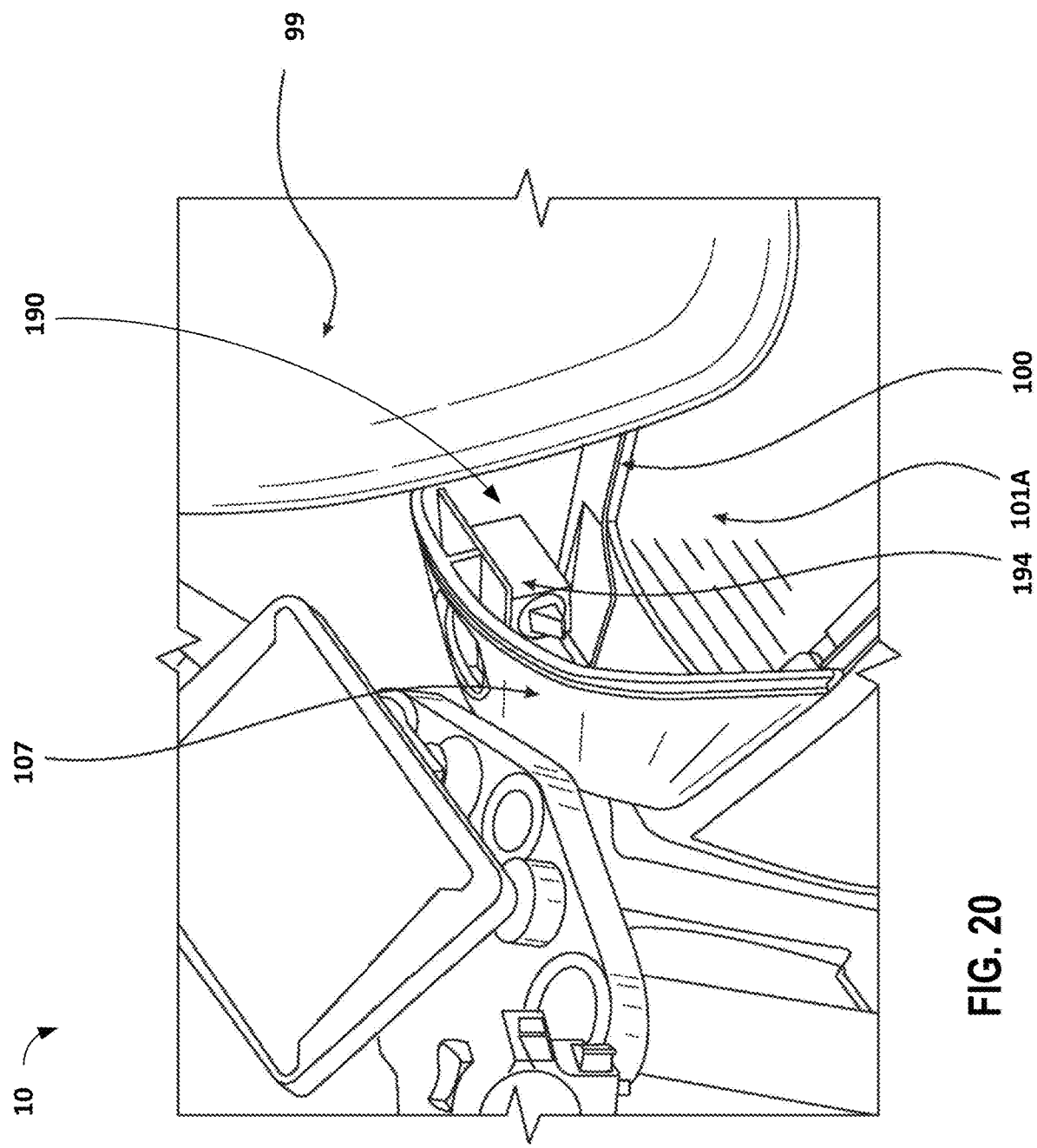
FIG. 20 illustrates a partial side perspective view of the saddle type vehicle of FIG. 15 with the storage cover open according to aspects disclosed herein.
Figure 21:
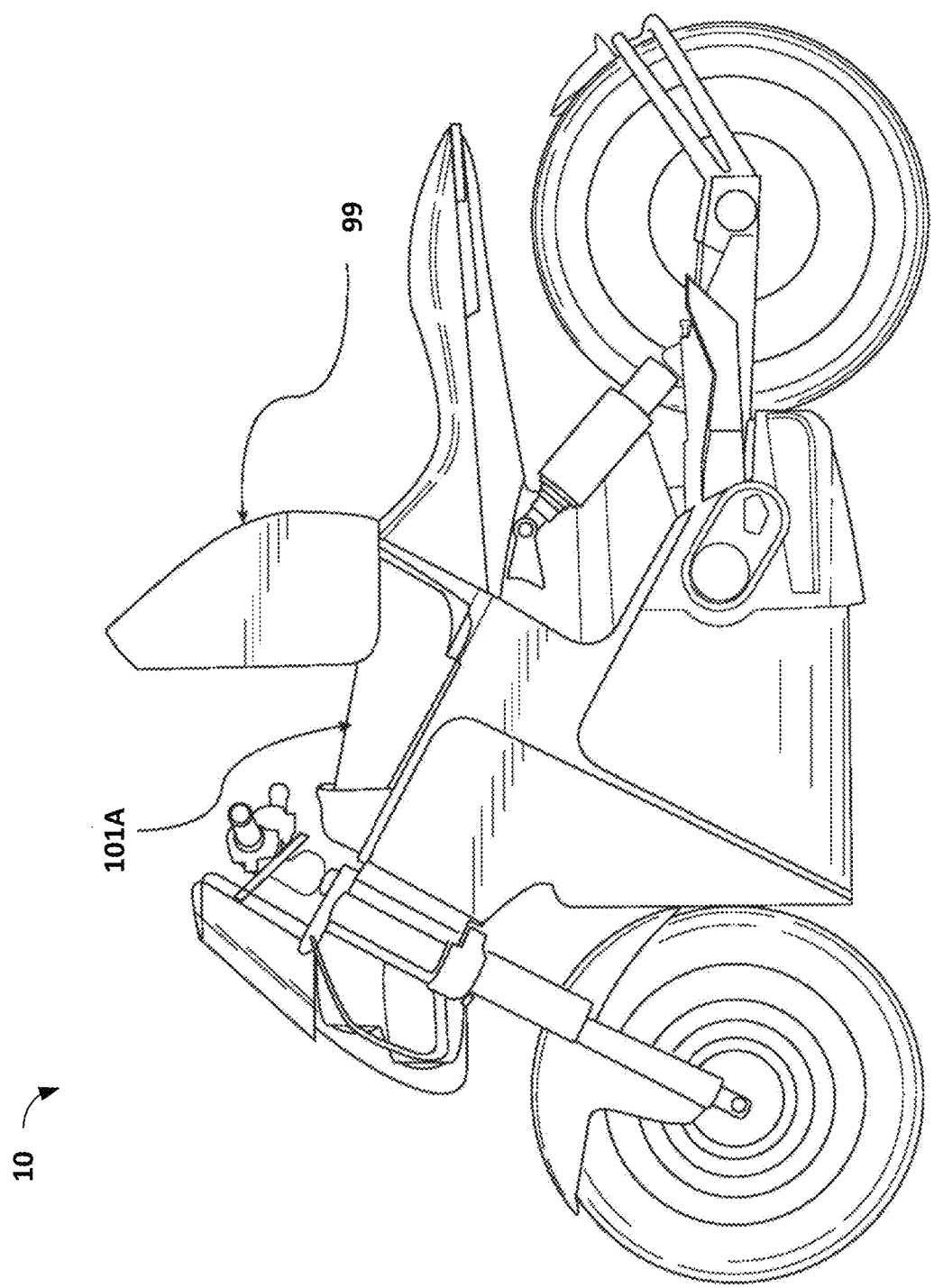
FIG. 21 illustrates a side view of the saddle type vehicle of FIG. 15 with the storage cover open according to aspects disclosed herein.
Figure 22:
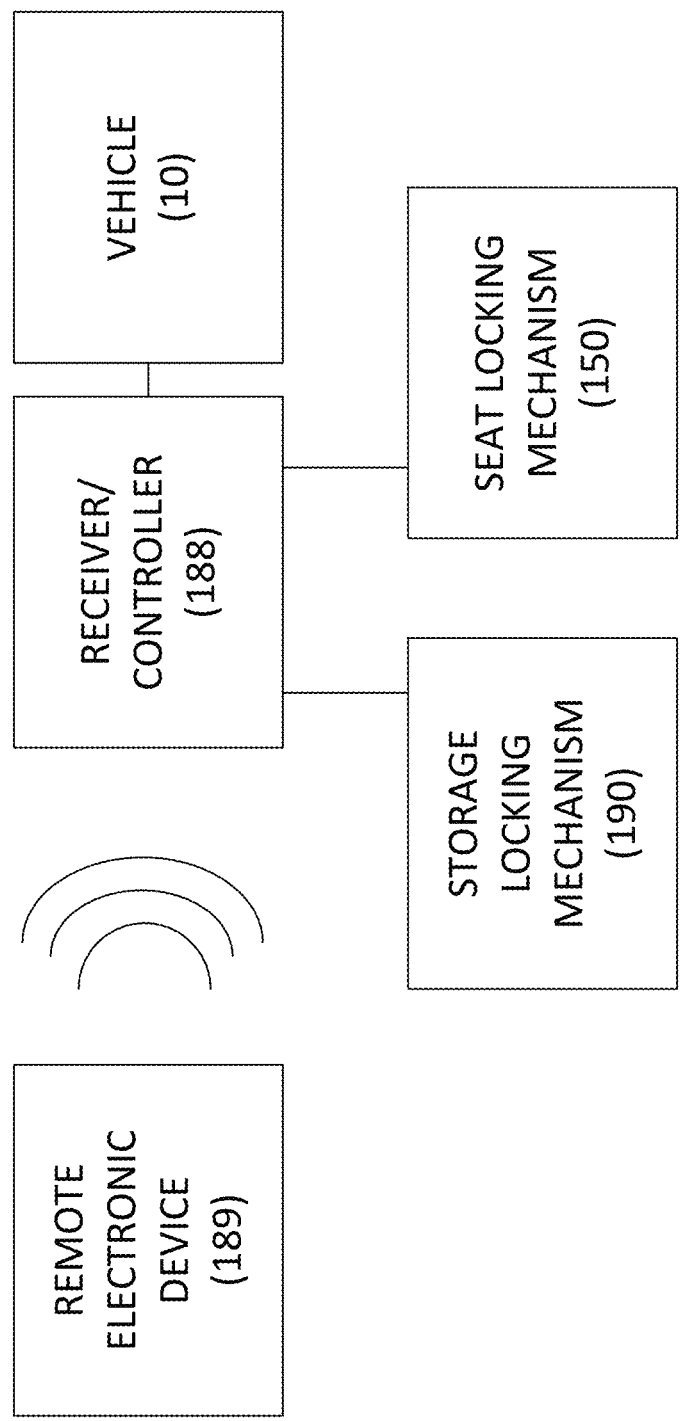
FIG. 22 illustrates a schematic of the remote control of the locking mechanisms according to aspects disclosed herein.

FIGS. 15-22 illustrate another example saddle type vehicle 10 similar to the saddle type vehicle 10 described above described in FIGS. 1-14. The example vehicle 10 shown in FIGS. 15-22 may incorporate electronic locking mechanisms to secure the onboard storage and access to the charging port where the locking mechanisms may be controlled by a remote electronic device. FIGS. 15-22 further illustrate a saddle type vehicle with an electronic locking mechanism 190 that secures the storage compartment cover 99 as well an electronic locking mechanism 150 for securing the seat 28. The saddle type vehicle 10 may include onboard storage in multiple locations and a high voltage charge port 40, where a user may activate electronic locks through a remote electronic device 189 such as a phone, computer, fob, or other electronic device known to one skilled in the art as shown in FIG. 22.

FIGS. 15-18 illustrate a saddle type vehicle 10 similar to the saddle type vehicle described above with respect to the examples in FIGS. 1-14. Motorcycle, or saddle type vehicle, 10 in FIGS. 15-22 may have a similar chassis 12 along with a primary storage compartment 100 located under storage cover 99 that is located in front of the rider. The high voltage charging port 40 may be located underneath seat 28, and a secondary storage area 30 may also located under seat 28. The vehicle 10 may try to maximize its storage capability through the use of under seat and other storage areas, and also quick charge ports 40 take advantage of the availability of urban high voltage charging stations.

The saddle type vehicle 10 as shown and described below incorporates onboard storage 30, 100 and a high voltage charge port 40, where access to these features may be controlled through phone or fob activated electronic locks. The illustrated example may include staged access to the quick charge port 40 under the front of the seat 28 via the release of a solenoid type latch 162 where an actuator 166 may push the seat 28 rearward on rails until the port 40 is exposed. The staged access continues to expose under seat storage 30, wherein a second solenoid type latch 172 may release the seat 28 to swivel upwards on a hinge, where the seat 28 is raised by a second actuator 182. This allows access to the storage area 30 under the seat 28. Through this arrangement, the vehicle 10 may have the charge port 40 exposed for connection at a charging station, while under seat storage 30 remains locked and inaccessible. Alternatively, both the charging port 40 and under seat storage 30 may be accessible using a single stage locking mechanism.

The seat locking mechanism 150 may control access to the charging port 40 as well as access to the secondary storage area 30. The seat locking mechanism 150 may have a locked configuration and an unlocked configuration. When the locking mechanism 150 is in the locked configuration, a user cannot access the charging port 40 or the secondary storage 30. The locking mechanism 150 may have an unlocked configuration that provides staged access first to quick charging port 40 when in the first unlocked stage and when in the second (or fully) unlocked stage allows access to both the quick charge electrical port 40 and the secondary storage compartment 30 located underneath the seat 28. In addition, the seat locking mechanism 150 may include a first locking assembly 160 to control the first unlocking stage and a second locking assembly 170 to control the second unlocking stage. Through this arrangement the vehicle 10 may have the charge port 40 exposed for connection at a charging station, while under seat secondary storage 30 remains locked and inaccessible. Alternatively, both the charging port 40 and under seat storage 30 may be accessed when the seat locking mechanism 150 is fully unlocked.

Figure 16:
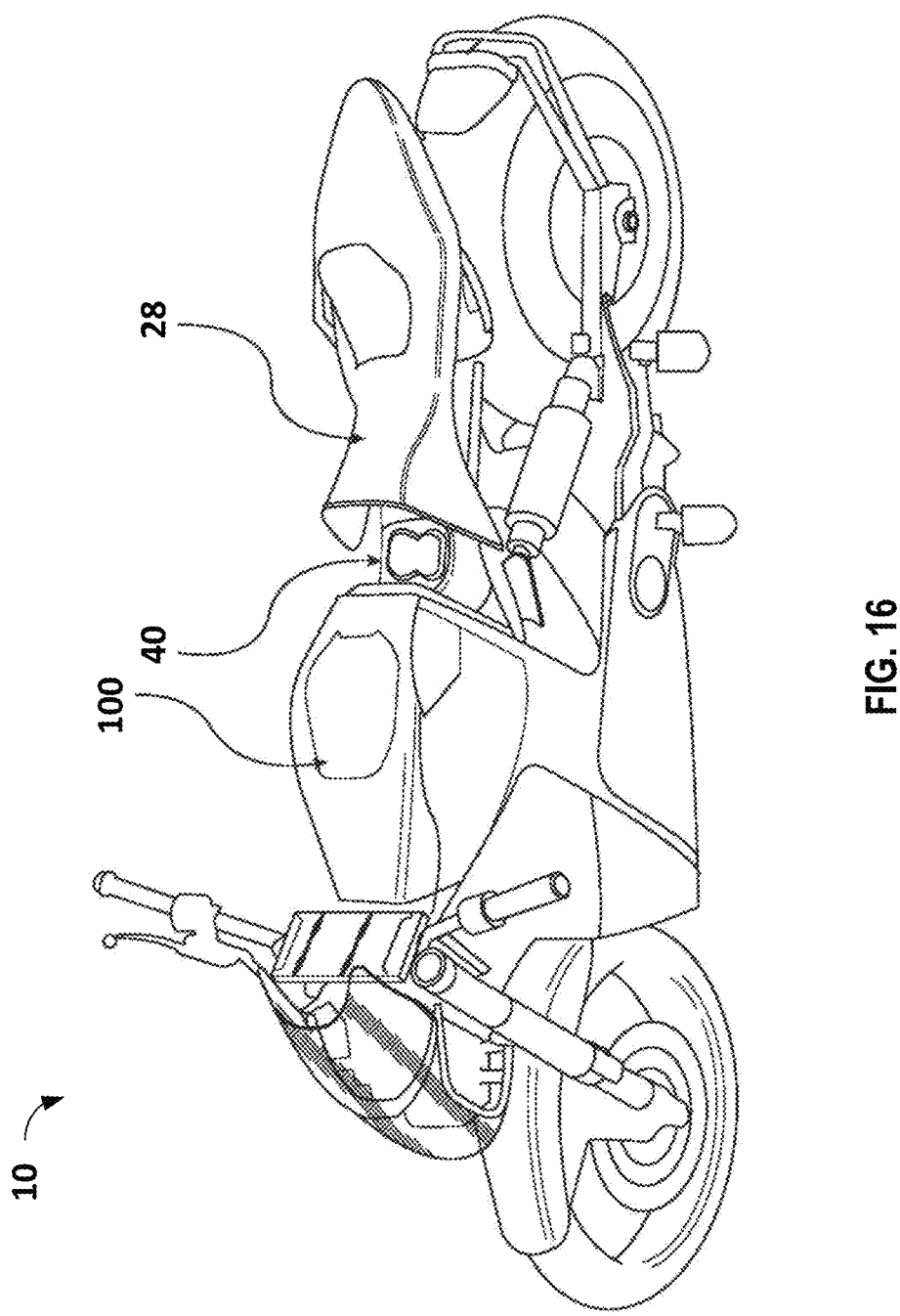
FIG. 16 illustrates a side perspective view of the saddle type vehicle of FIG. 15 with the seat shifted rearward according to aspects disclosed herein.
Figure 17:
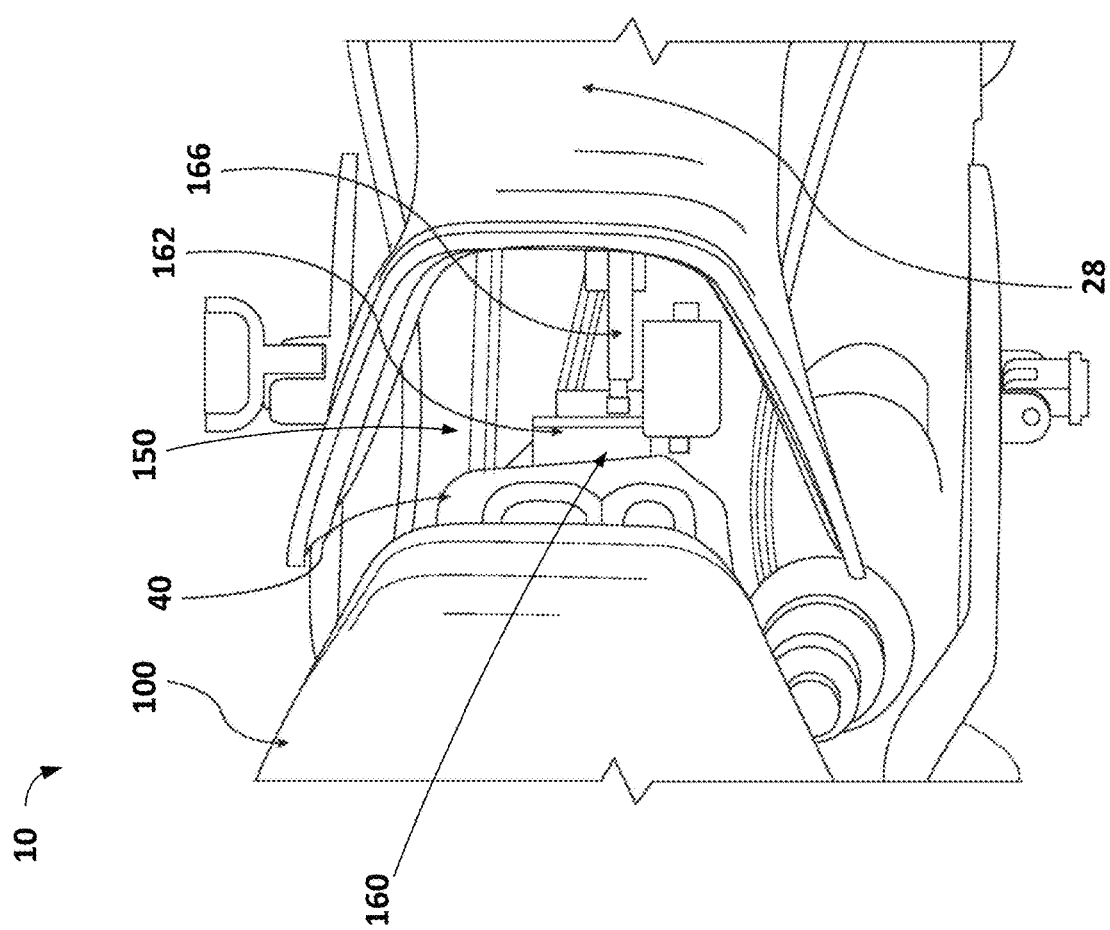
FIG. 17 illustrates a partial top perspective view of the saddle type vehicle of FIG. 15 with the seat shifted rearward according to aspects disclosed herein.
Figure 18:
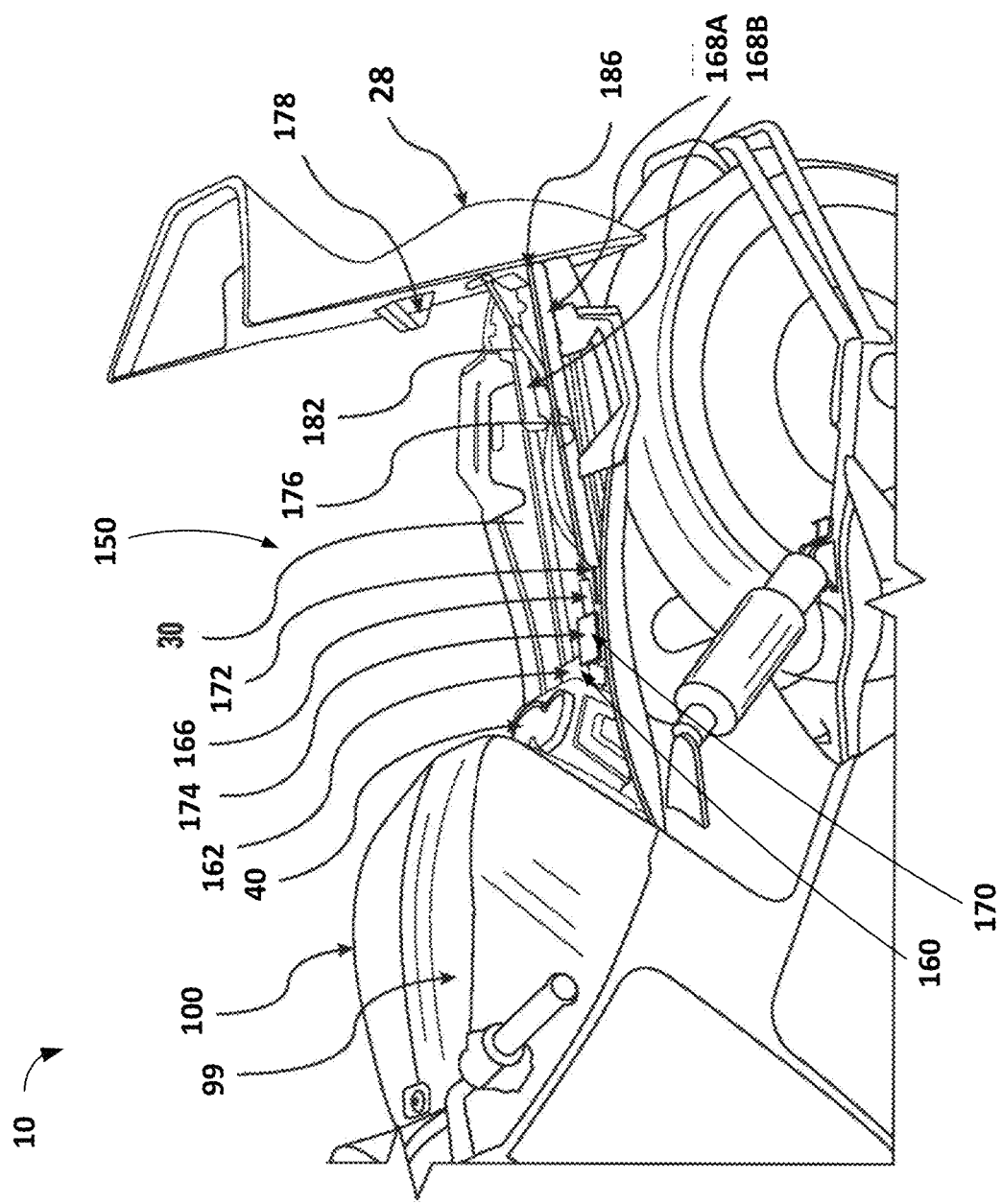
FIG. 18 illustrates a partial side perspective view of the saddle type vehicle of FIG. 15 with the seat rotated upwards according to aspects disclosed herein.

The first seat locking assembly 160 may control access to the charging port 40 such that when the first seat locking assembly is unlocked, the seat 28 may be allowed to slide a predetermined distance rearward to provide access to the quick charge electrical port 40. The first seat locking assembly 160 may include a first seat latch solenoid 162, a first seat latch, and a first seat actuator 166. The first seat latch may releasably engage the seat 28, and the first seat latch solenoid 162 may control movement of the first seat latch. When a command is received by a receiver/controller 188 to move the first seat locking assembly 160 from the locked configuration to the first unlocked stage of the unlocked configuration, the first seat latch is released from the first seat latch solenoid 162. Upon releasing seat latch, the first seat actuator 166 pushes the seat 28 rearward along a plurality of rails 168 to expose the quick charge electric port 40 as shown in FIGS. 16 and 17. The seat 28 may move rearward a predetermined distance. This predetermined distance may be determined by a length of the rails 168A, 168B such that the seat 28 may be slidably engaged with the rails 168A, 168B where the seat 28 has a pair of axles with wheels at each end that move along the rails 168A, 168B. The wheels may stop when the wheels on the rear axle 36 reach the end of the rails 168A, 168B to control the predetermined distance that exposes the charging port 40. The first seat latch may be located in the forward region under seat 28.

The second seat locking assembly 170 may control access to both the charging port 40 as well as the secondary storage compartment 30. The seat 28 may slide and rotate to a second position of seat opening is illustrated, and the mechanisms for both the first rearward movement of the seat 28 to expose charge port 40, and for a secondary rotation movement of seat 28 to expose secondary storage area 30. To allow rotational movement of seat 28 such that storage area 30 is exposed, solenoid 174 is triggered which pulls rod 172, opening a latching door 176, which releases front seat axle 178 as seat 28 is pushed upward by actuator 182 around the axis of rear axle 186. When the second seat locking assembly 170 is moved to the second unlocked stage, the seat 28 may slide a distance greater than the predetermined distance and then rotate upward around a rear pivot axis to allow access to the secondary storage compartment 30 as well as the charging port 40. The second seat lock assembly 170 may include a second seat latch 172, a second seat latch solenoid 174, a latching door 176 releasably engaged to the second seat latch, or rod, 172, where the latching door 176 may releasably engage a front seat axle 178 located on a bottom surface of the seat 28. Additionally, a second seat actuator 182 may be connected to the seat 28. When the second seat lock assembly 170 is moved from the locked configuration to the second unlocked stage of the unlocked configuration, the second seat latch solenoid 174 may pull the seat second latch 172, which in turn opens the latching door 176 to release the front seat axle 178 on the bottom of the seat 28. Upon release of the front seat axle 178, the second seat actuator 182 exerts a force on the seat causing the seat 28 to rotate upwards around a pivot axis of the rear axle 186 located near a rear end of the seat 28.

Figure 19:
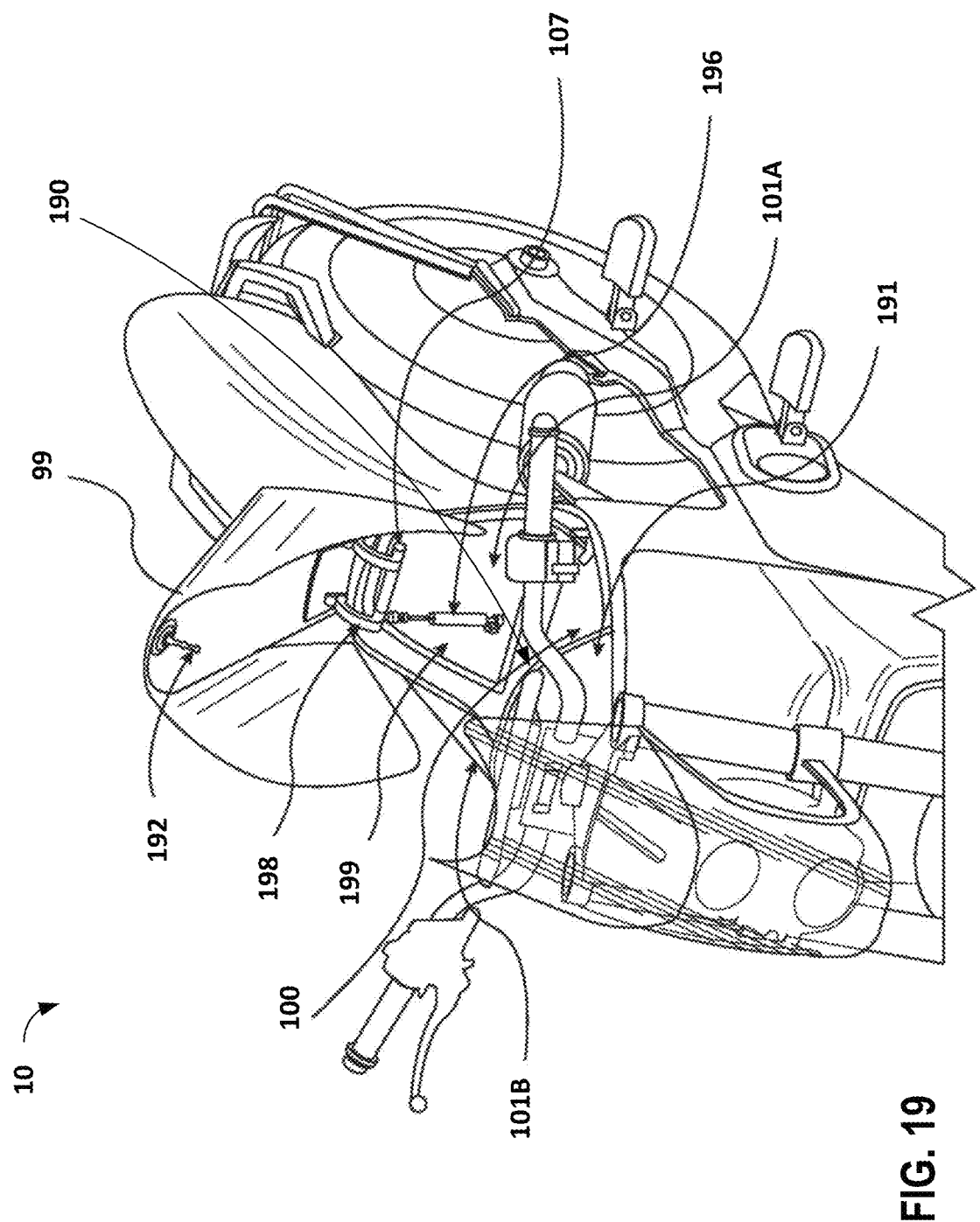
FIG. 19 illustrates a partial front perspective view of the saddle type vehicle of FIG. 15 with the storage cover open according to aspects disclosed herein.

As shown in FIGS. 19-21, a primary storage compartment 100 may be located forward of seat 28 and also located above a battery housing 22. The storage compartment 100 may be accessed via by rotating the storage compartment cover 99 around a cover hinge axis 107. A storage locking mechanism 190 may control the movement of the cover 99 such that the storage locking mechanism 190 may have an unlocked configuration to allow access to the primary storage compartment 100, and a locked configuration to secure the primary storage compartment 100. The storage locking mechanism 190 may include a storage latch pin 192, a storage latch solenoid 194, a storage actuator 196, a cover hinge 197, and a mounting plate 199. The storage latch solenoid 194 may be mounted in the latch mount housing 191. When the storage locking mechanism is moved from the locked configuration to the unlocked configuration, the storage latch solenoid 194 may release the storage latch pin 192. Upon release of the latch pin 192, the storage actuator 196 may exert a force on a hinge plate 198 of the cover hinge 197 to rotate the cover 99 about the cover hinge axis defined by the fixed pivot on the mounting plate 199. The storage actuator 196 may mount at its lower end on vertical mounting plate 199 and push on the hinge plate 198 that is fixed to the storage cover 100.

The storage compartment 100 may further include a flexible fabric liners or mesh retainers 101A, 101B arranged on both sides to prevent items stored inside storage compartment 100 from falling out the sides.

The locking mechanisms 150, 190 may be activated using a remote electronic device 189 such that the locking mechanisms 150, 190 may be moved from the locked configuration to the unlocked configuration using the remote electronic device 189. The saddle type vehicle 10 may have a receiver/controller that can communicate wirelessly with the remote electronic device 189. In some examples, the locking mechanisms 150, 190 may have their own receiver/controller to communicate wirelessly with the remote electronic device. The remote electronic device 189 may have separate buttons or button sequences on to lock or unlock each mechanism 150, 190 to enable or prevent access to each storage compartment 30, 100. As other options, the remote electronic device may include separate screen buttons, voice commands, or other user interface to allow a user to lock and unlock the locking mechanisms 150, 190. The remote electronic device may connect via Bluetooth or similar unique wavelength connectivity, and also serve to control enabling operation of the electric motor and locking of the vehicle either by a steering lock or other chassis lock such as a rear wheel rotation latch which is solenoid activated via the fob or phone.

In some examples, separate buttons or button sequences on a fob access each locked space, or separate screen buttons or voice commands do the same from a mobile phone. The remote electronic device 189 may be wirelessly connected to the receiver 188 of the vehicle 10 via Bluetooth or similar unique wavelength connectivity. The receiver/controller 188 may be connected locking mechanisms 150, 190, the motor controller 45, as wells as other electronic components of the vehicle 10. The remote device 189 may also serve to control and enable operation of the electric motor and locking of the vehicle either by a steering lock or other chassis lock such as a rear wheel rotation latch which may also be solenoid activated via the fob or phone. Both of either the fob or mobile phone and the mechanisms on the motorcycle 10 are built to handle Bluetooth or similar unique wavelength signals. The fob or phone send command signals for mechanism operations. The mechanisms on the motorcycle 10 may have signal receivers and respond to the commands from the fob or mobile phone with responsive motions of solenoids, to both open and close access to the charging port and storage areas. The motorcycle may also generate command signals for operation independent of reliance on a fob or phone, and these signals may be transmitted wirelessly or by wire.

The solenoids 162, 174, 194 may be electromagnetic devices that are capable of securing and releasing a latch. Additionally, the actuators 166, 182, 196 for the locking mechanisms 160, 170, 190 may be pneumatic or gas shocks or springs, electromechanical actuators, mechanical springs, or other linear type actuator known to one skilled in the art.

The shape and size of storage compartments 30, 100 along with the seat configuration and covers may be different. The primary storage 100 may have a greater volume than the under seat storage 30. The concept may be equally applicable to any saddle type vehicle 10 no matter number of wheels, and the functions of access to these locations could also be performed manually via mechanical lock mechanisms in place of solenoids, and where the operator's manual action may push the seat 28 rearward as well as rotate the seat 28 to access the secondary storage 30. Similarly, the storage compartment cover 100 may be manually opened to access the storage compartment 100.

Generally, some of the example saddle-type vehicles disclosed herein may include two structural modules. The RESS comprises a battery cell pack and battery management system components, which along with the onboard charger DC/DC converter combo are sealed in a shell type module, or battery housing 22 which may be constructed of two die cast magnesium halves bolted together to enclose the RESS. The battery housing 22 may form a portion of the lower section of the motorcycle chassis structure. This module may allow dissipation of heat through air convection to the ambient through the housing 22, or the battery pack may be surrounded by a thermally conductive but non-electrically conductive material that fills the space and conducts heat away from the battery. The internal region of the module and/or battery housing 22 may have liquid cooling passages built in. The high voltage DC charging port, as well as other electrical components such as the controller and high voltage contactors may be sealed in a rear module 34 which may also be constructed of thin wall castings, and which comprises the rear structure of the frame, to which the rear suspension is mounted. Some examples may be two wheeled with a hub motor mounted at the rear of the suspension member, and a rear wheel 20 mounted to it. It is envisioned that the same chassis structure could be utilized for a saddle type vehicle with two rear wheels and/or two front wheels. The front upper chassis section which mounts the front suspension, tire and steering is attached at the bottom to the upper part of the RESS module or battery housing 22 and at the rear to the upper front of the rear module. When these three modules are attached to each other, they create the complete structural frame of the chassis. The example as shown may use styled cast magnesium shells for the structural modules, and the outer surfaces of the modules additionally serve as a significant portion of the bodywork of the vehicle while the inner surfaces have internal mounting points for the various high voltage electrical components. These module shells are recommended to be closed during vehicle manufacture process using special fasteners that would require unique tools. This will reduce the likelihood of tampering and injury from high voltage by an inexperienced technician. The RESS module may have a service disconnect which may be designed such that it must be removed before removal of the module. With the service disconnect pulled, the electrical connections on the outside of the RESS module are disconnected from the battery pack itself.

Many derivations of this modular shell construction are possible, all of which are considered part of the invention, but all cannot be shown. Although die cast magnesium is considered a good choice, any structural material may be used, as long as it is capable of carrying the required chassis loads.

Figure 29:
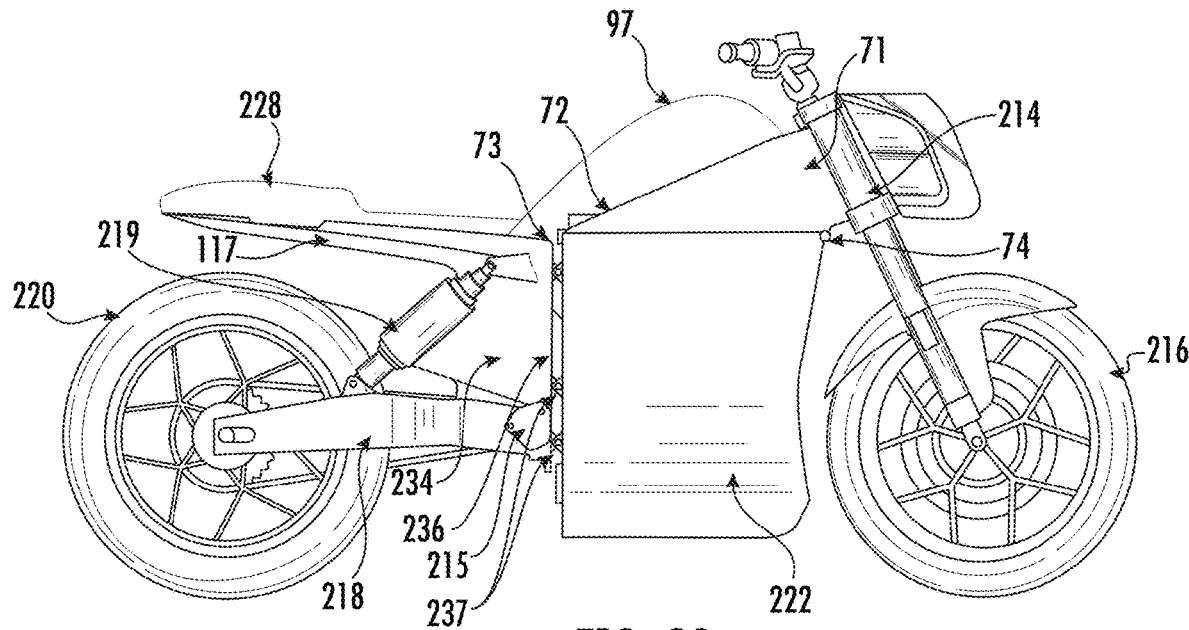
FIG. 29 is a side view of the motorcycle of the present disclosure utilizing three modules to construct the entire structural suspended chassis.
Figure 30:
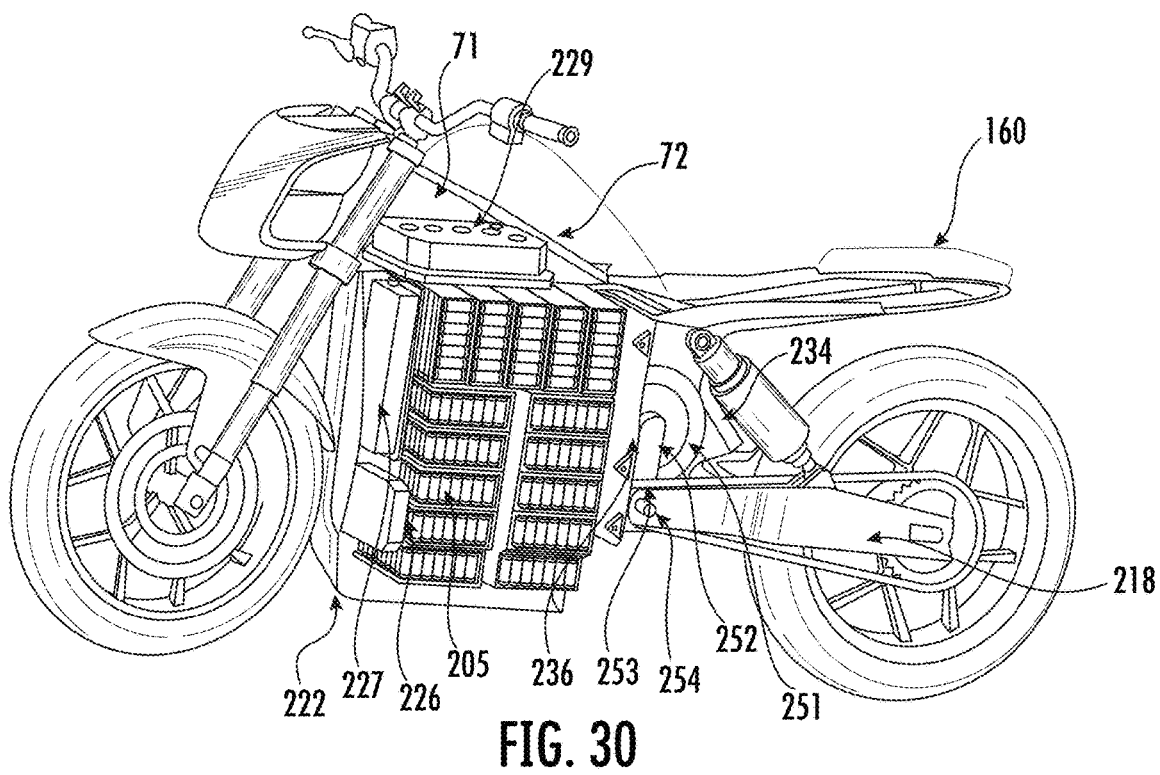
FIG. 30 illustrates a perspective view of the vehicle of FIG. 7 with modules cut open to show internal components.

In the example shown in FIGS. 29 and 30, the complete chassis is constructed from three structural hollow shell modules. In this example, the electric motor is not a hub motor, but instead is mounted in the third or rear module, with a drive means such as chain, belt, driveshaft or hydraulic conducting the rotation of the onboard electric motor into rotation of the drive wheel(s) of the vehicle. In the illustration of this example, the high voltage electric motor is mounted inside the rear module 234 to which the rear suspension and rear wheel are mounted. This may require some of the components, which are mounted in the rear housing 34 in other examples to be moved to the front module; however, location of components is flexible, as long as high voltage components are inside one or more of the structural modules. This example may have a much larger RESS module, and has the controller and additional electrical components enclosed inside the front module of the chassis that mounts to the steerable front suspension 214.

For further simplification and reduction of parts, in another embodiment which houses the electric motor inside the rear structural module, such onboard electric motor may be constructed such that the stator components and rotor bearings are directly mounted to the inside of the rear housing shell 234. Fins for air cooling or passages for liquid cooling may be incorporated into motor and/or RESS housings 222.

Figure 23:
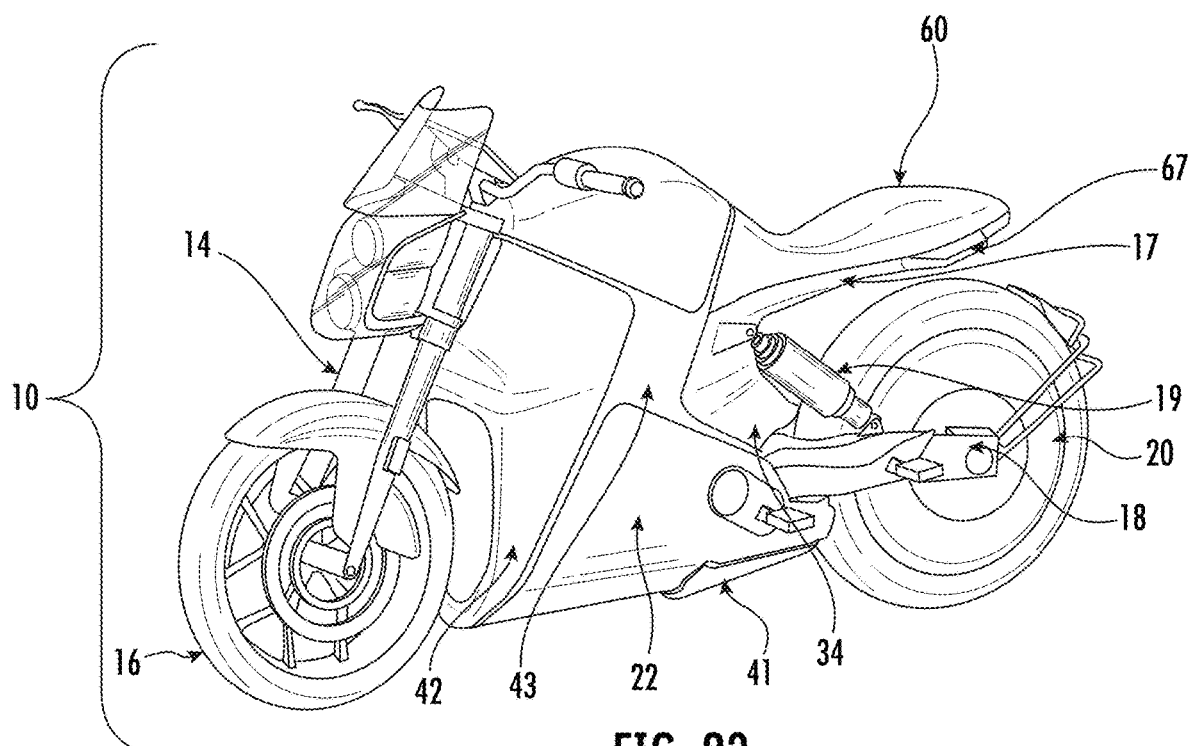
FIG. 23 is a perspective view of the first embodiment which is a motorcycle utilizing two modules as main chassis members and one chassis section of a more conventional type.

Specifically, FIG. 23 illustrates one example of the vehicle 10. A two wheeled saddle type vehicle 10 constructed utilizing a front structure 32 may mounting to a front telescoping suspension 14 to which is mounted front wheel 16. The front structure 32 may also attach to the rear module, or electronics housing, 34 to which is mounted rear suspension spring and damper 19, swingarm 18 with rear wheel 20, and seat support structure 17 to which is mounted seat 28 and passenger grab handles 67. Under front structure is attached RESS module 22. Some structure is hidden under cosmetic covers 41, 42, and 43.

Figure 24:
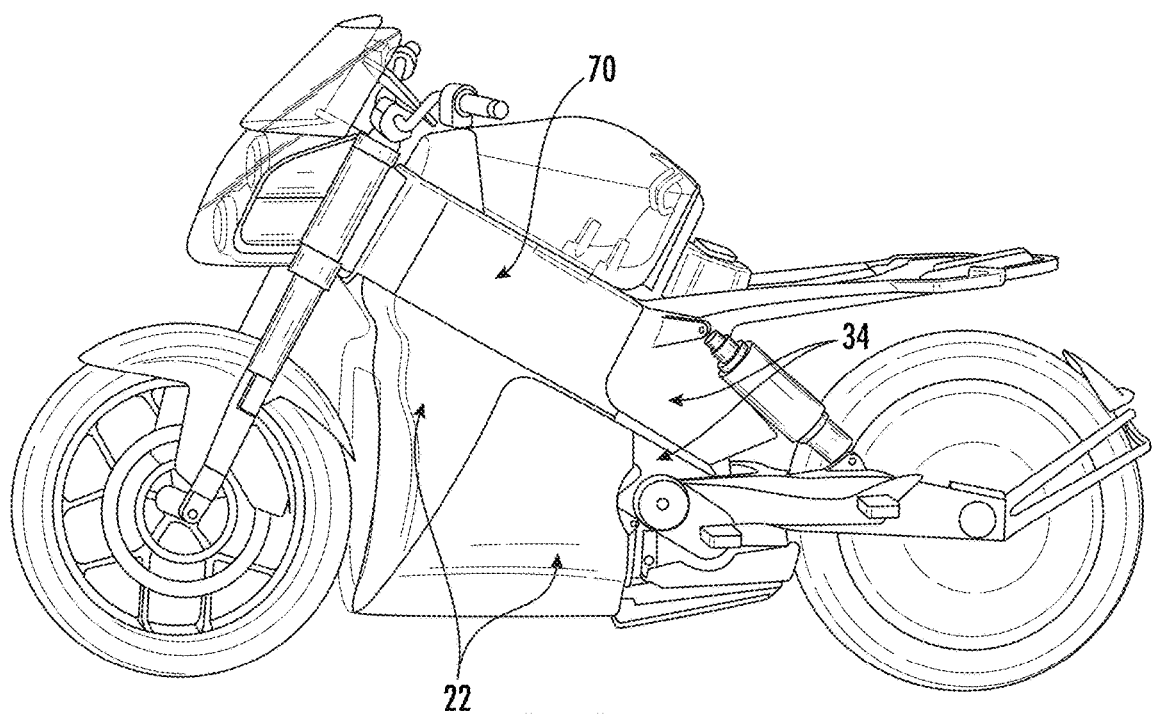
FIG. 24 is a view of the motorcycle of FIG. 23 with some external components removed to better illustrate the modules.

FIG. 24 illustrates the vehicle in FIG. 23 with some body cosmetic covers and seat removed to better illustrate the structural members 24, 26 and their attachment to RESS module 22 and to rear module, or rear structural electronics housing 34.

Figure 25:
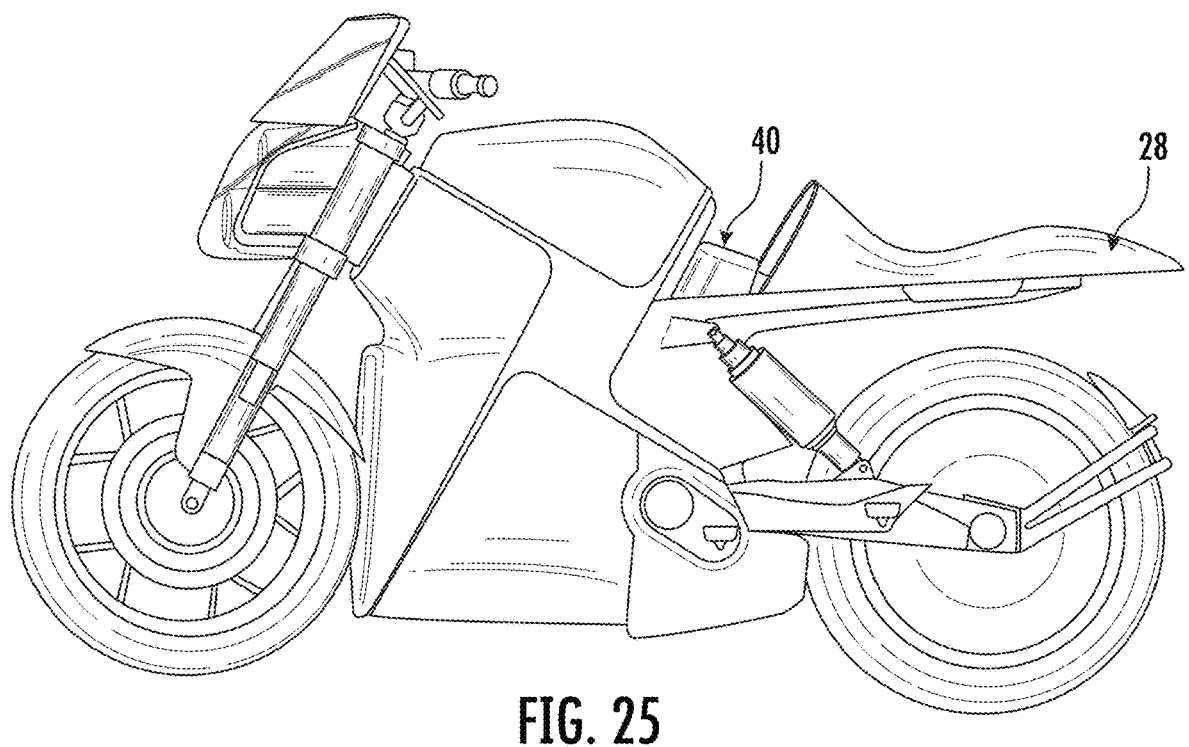
FIG. 25 illustrates a side view of the vehicle of the present disclosure.

FIG. 25 illustrates seat 28 slid back to expose electrical quick charge port 40.

Figure 26:
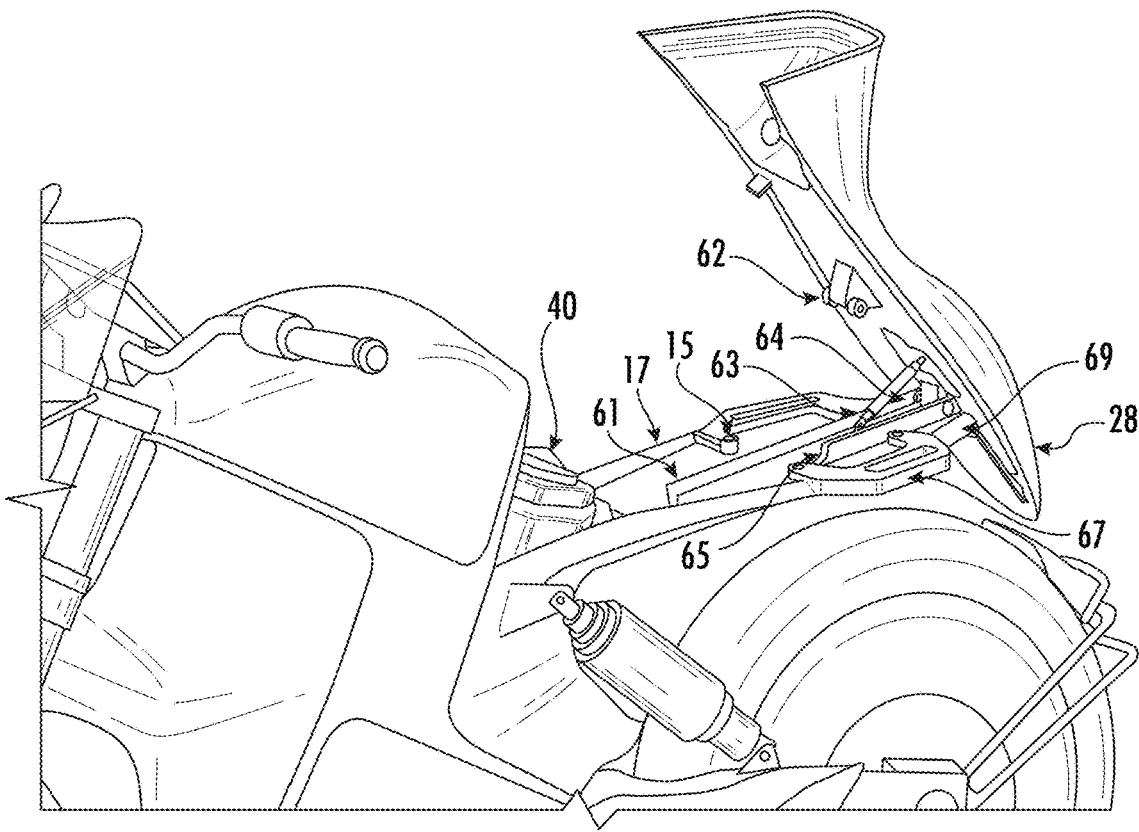
FIG. 26 illustrates a perspective view of the present disclosure with the seat in a rolled back position.

FIG. 26 illustrates the seat 28 in the rolled back and rotated position showing the rails 61 on which seat 28 slides back, as well as the wheels 62 which roll in the rails the gas spring 63 which rotates seat around rear seat wheel axis 64 and seat rotation latch mechanism 65. Also, note grab handles 67 and taillight 69 attached to seat support 17 with flush bolts 15. The top surface of grab handles, taillight and seat support are flat so that the seat when slid forward matches to this surface. Note that base of seat 28 has a recessed cavity such that it clears taillight when seat is rotated open.

Figure 27:
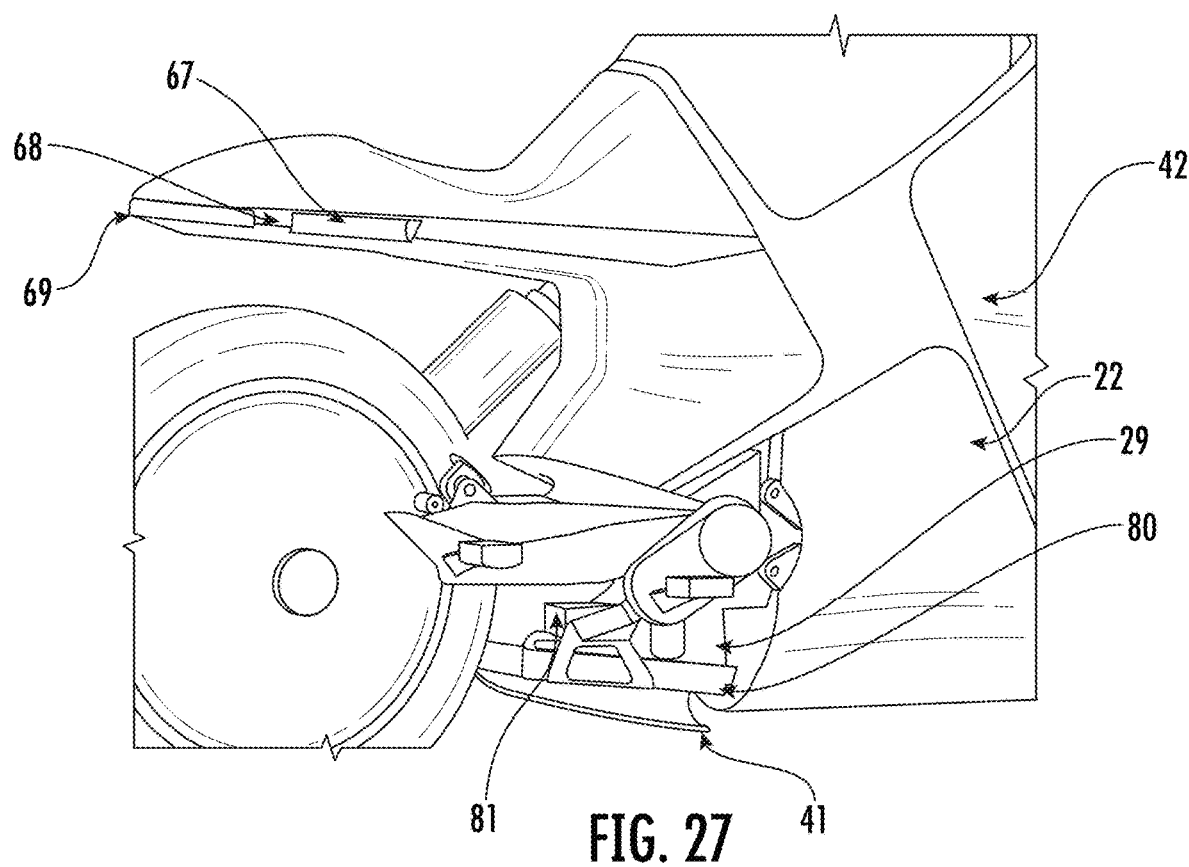
FIG. 27 is a perspective view of the back of the vehicle of the present disclosure.

FIG. 27 illustrates a number of components. Turn signals 68 are integrated into grab handles 67. Service disconnect 29 is for emergency shut down of battery pack inside RESS module, or battery housing 22. Radiator 80 and coolant pump 81 are shown, mounted under the swingarm 18 and fed cooling air by a scoop shape in cosmetic cover 41, the right side of which is removed in this illustration.

Figure 28:
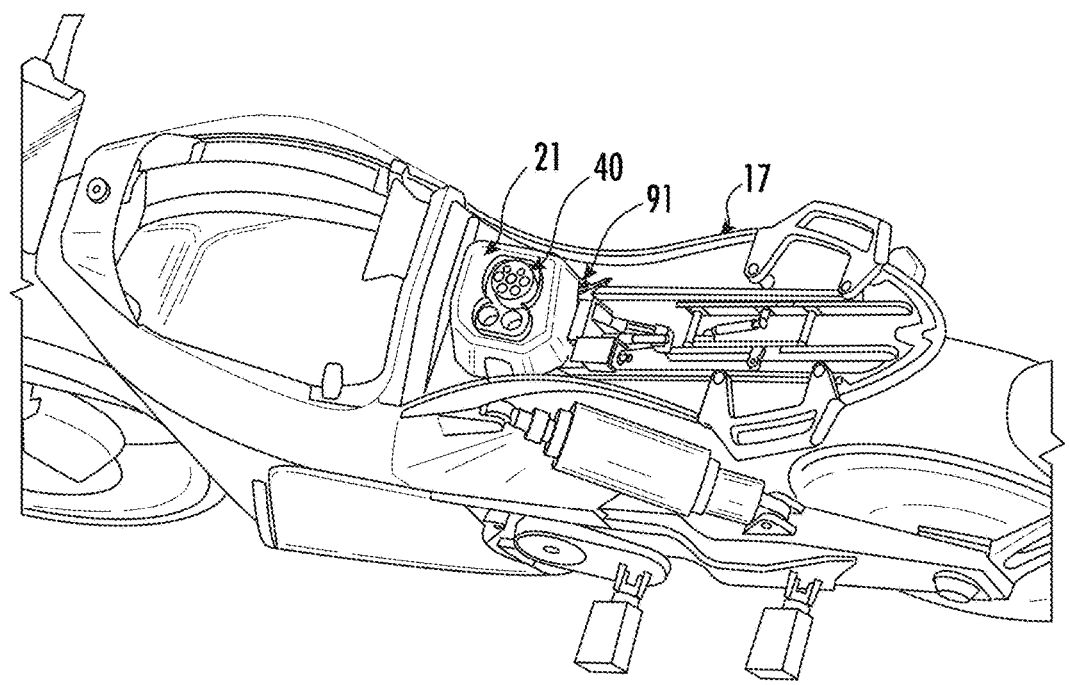
FIG. 28 is a perspective view of the vehicle of the present disclosure with modules cut open to show internal components.

FIG. 28 illustrates electrical quick charge port 40 and housing 21 showing fasteners 91 attaching housing to seat support 17, such that different housings may be utilized for different charge port designs.

FIG. 29 illustrates an example in which the entire chassis is built from three modules containing electrical components. Front module consists of main housing 71, or structural members 24, 26, along with cover 72. A possible cosmetic cover is shown as a profile line 97. Housing 71 mounts steering and front suspension 214 to attach wheel 216. The battery housing 222, which contains the RESS, may attach to a bottom of housing 71 via attachments 73 and 74. To the rear of module, or battery housing, 222 is attached electronics module 234 at attachment points 237. Electronics module 234 has a front access plate 236. To the top of module 234 is attached seat support 117 and a possible seat profile 228 is illustrated. Rear suspension consists of spring and damper units 219 and swingarm 218, with swingarm 218 rotating about bearings behind access covers 215 to enable movement of rear wheel 220.

FIG. 30 illustrates an example with portions cut away to see components. RESS housing 222 has the left side removed to show battery cell pack 205, battery management system 226 and charger DC/DC converter 227. Upper module is cut away to show motor controller 229. Rear module is cut open to show electric motor 251, gear reduction housing 252, drive chain 253 and pivot shaft 254.

Still other examples described herein may relate to aspects relate to a saddle type vehicle having at least one seat and at least two wheels, at least one electric motor, and a rechargeable electric energy storage system ("RESS"), such as a battery and battery management system. The vehicle of the present disclosure comprises a chassis constructed with a hollow rear section containing electrical components. Said chassis has a rear suspension with a swingarm having a forked front section which pivots on two co-linear bearings, one to the left of the hollow section and one on the right, with one side of said fork on each side of the hollow rear section such that hollow rear section can contain electrical components at and below the suspension swingarm axis.

Some of these example saddle type vehicles may include a unique rear suspension design, which mounts to a chassis, which has sealed shell type rear structure with a number of electrical components and wiring inside it. To maximize the volume available for this shell structure 34, the design has a swingarm 18 acting as a rear main suspension member, which uses bearings mounted in two bosses, one on the right side and one on the left, both of which are part of the rear chassis section. These bosses are external to the hollow cavity in which electrical components are enclosed, and said bosses are spaced away from the outer walls of the hollow chassis shell such that two arms of the rear suspension fit in between the housing outer walls and the bosses. This allows the hollow shell to continue down through the rear suspension pivot axis, providing more internal volume, and additionally may allow any wiring coming from the housing to electrical components on the rear suspension, such as a hub motor, to exit the housing and enter the rear suspension swingarm at a point essentially co-linear with the rear suspension pivot axis, thus reducing motion of the wiring with suspension travel. The design also uses two simple bolts for mounting the swingarm, such that the swingarm can be easily removed for service. The bearings may be retained by components having other uses, such as the rider and passenger footrest mounts. The shock absorber(s) and spring(s) may be mounted at the top directly to boss(es) that are part of the same hollow chassis structural casting which has the swingarm pivot bosses.

One exemplary saddle type vehicle includes a forked rear suspension member with wheel mounted at the rear, pivot axis at the front with one mount bearing on the right and one on the left of a hollow main chassis structure containing electronics components, and at least one rear shock absorber/spring mechanism mounted at one end to the swingarm and at the other to the hollow main chassis structure.

Figure 31:
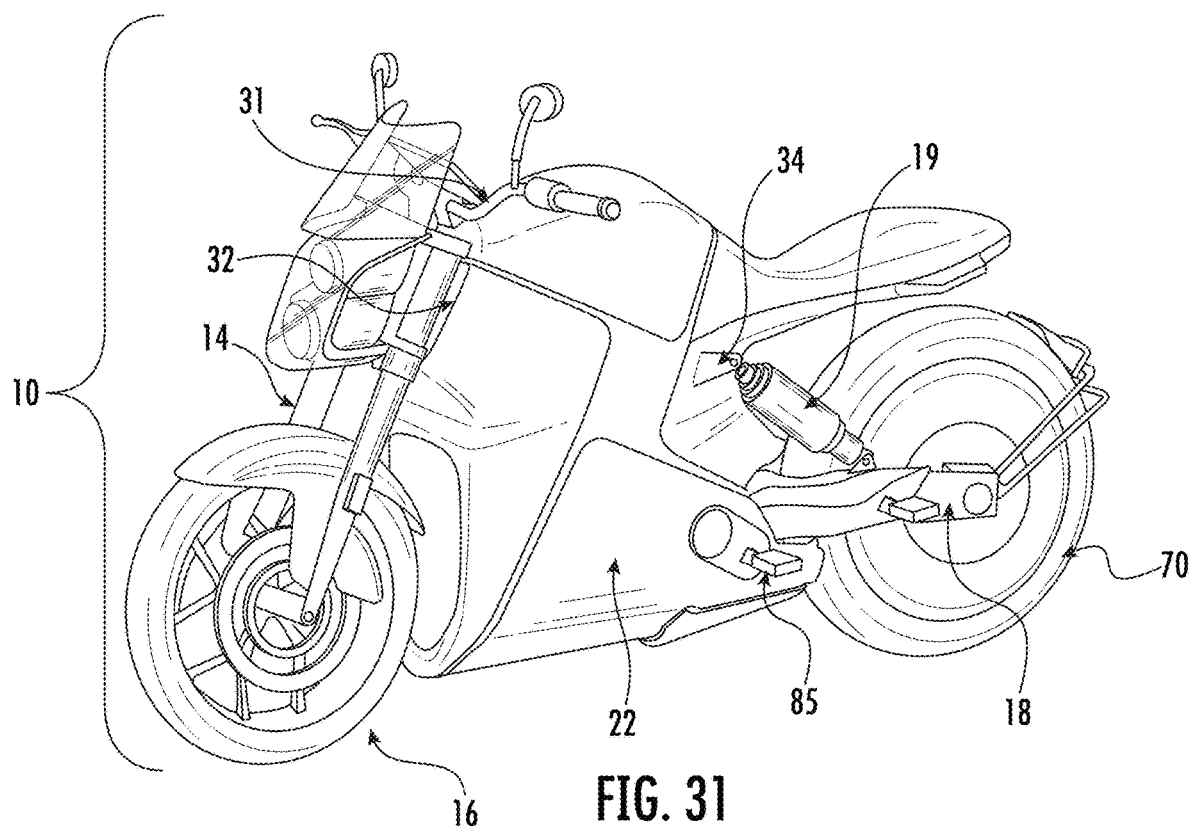
FIG. 31 illustrates an external view of the first embodiment which is a motorcycle with an electric wheel motor and single side suspension arm.

FIG. 31 illustrates a two wheeled saddle type vehicle 10 constructed with a battery housing 22 attached at its top to steering mount structure 32 and/or structural members 24, 26 to which is attached the steering mechanism 31, front suspension 14 and front wheel 16, and at the rear to a shell type housing 34 which encloses electrical components. The rear suspension comprises a swingarm 18 with a forked front attached at its front pivot axis with bolts which run through bearings mounted in ears that are part of the rear shell chassis housing 34, and one spring and damper mechanism 19. Bearings are retained by footpeg mounts. Rear wheel 20 and tire assembly 70 includes an electric hub motor, and is attached to the right side of the single rear arm of swingarm 18.

Figure 32:
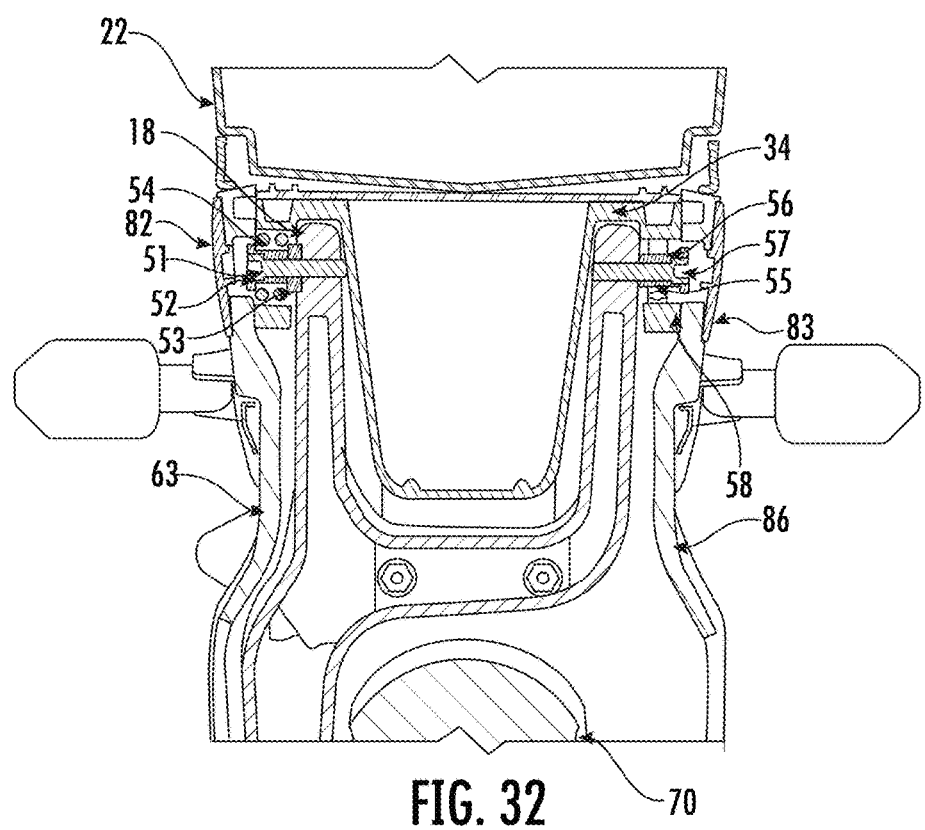
FIG. 32 illustrates a view of the motorcycle of FIG. 31 showing a section through the swingarm pivot axis.

FIG. 32 shows a cross-section through the swingarm pivot axis. Swingarm 18 is mounted on the left by bolt 51, which clamps stub axle 52, clamping spacer 53, and left bearing 54 inner race to the swingarm left ear fork. Left bearing 54 outer race is pressed into left boss of housing 34, and is retained by attaching the left footpeg mount 85. Swingarm 18 is also mounted on the right by bolt 57 which clamps stub axle 55 to swingarm. Stub axle 55 outer surface is a slip fit inside inner race of right bearing 56, while outer race is pressed into right boss of housing 34. Bearing spacer 58 retains right bearing 56 from sliding to the right once right footpeg mount 86 is attached to housing 34. To remove swingarm 18, left and right cosmetic covers 82 and 83 bolts are removed. Then bolts 51 and 57 are removed, swingarm 18 is slid to the right, spacer 53 removed, then swingarm 18 can be moved back to the left and rearward.

Figure 33:
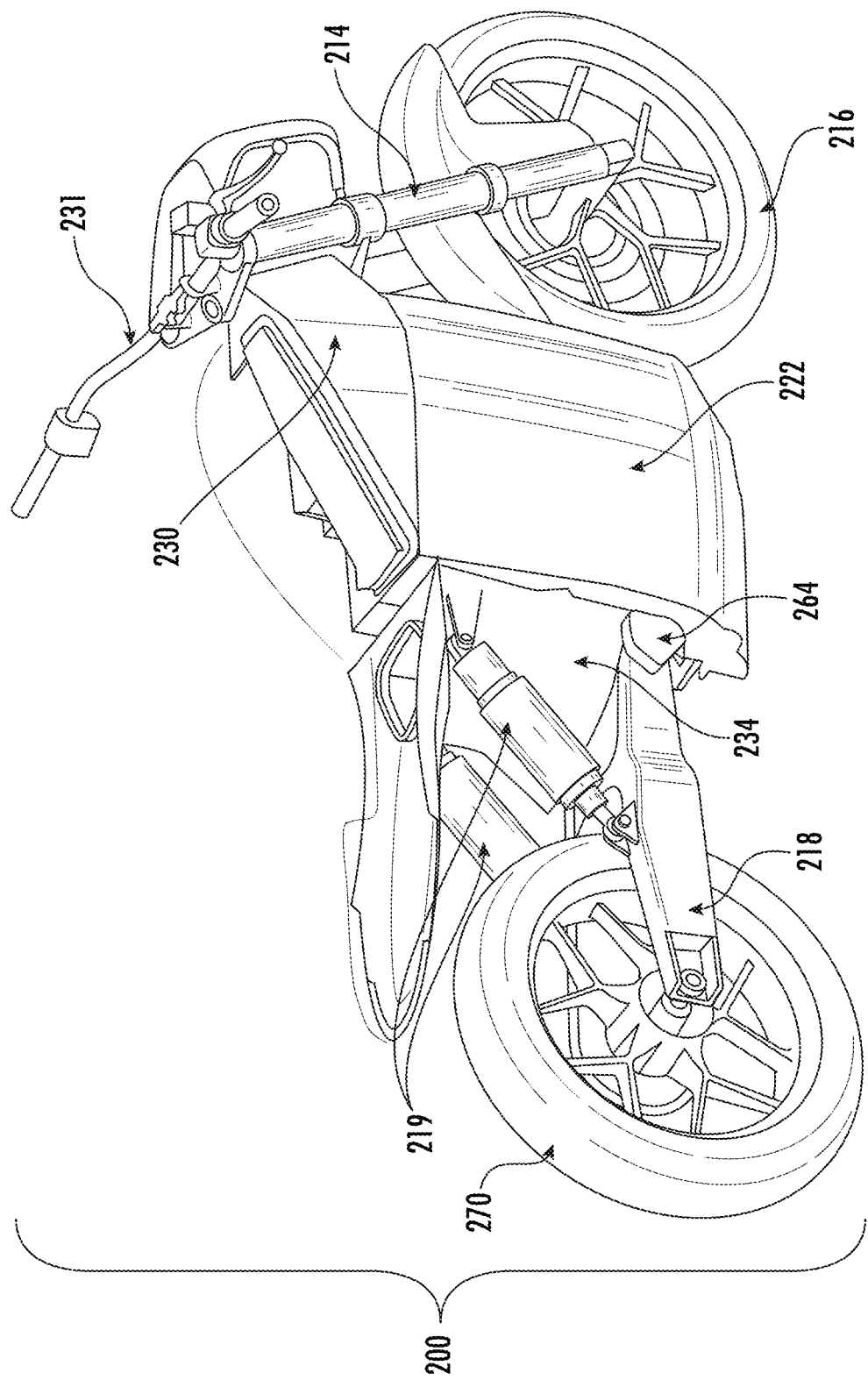
FIG. 33 illustrates an external view of an alternate embodiment which comprises an electric motor in the rear housing with a chain drive back to the rear wheel and utilizes two shock absorbers, wherein the swingarm is on both sides of the rear wheel.

FIG. 33 illustrates another exemplary two wheeled saddle type vehicle 200 where structural battery housing 222 is attached to a top hollow structure 230, or structural members 24, 26, containing electronic components and mounting steering mechanism 231, front suspension 214, and front wheel 216, and is also attached to a rear hollow structural housing 234 which contains an electric motor, and mounts rear suspension and wheel system comprised of swingarm 218, two rear spring and damper units 219, and rear wheel/tire assembly 270. In this embodiment swingarm bearing are constrained into housing 234 with retainer plates 264 as shown.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed:
1. An electric saddle type vehicle comprising:
a saddle type vehicle chassis including:
a steering mount structure at a front end of the chassis, wherein the steering mount structure is configured to attach to a front suspension;
a structural member connected to and extending from a rear end of the steering mount structure to a front end of an electronics housing, wherein the electronics housing contains electrical components; and
a swingarm configured to support a rear wheel, wherein the swingarm has a front swingarm fork, wherein the front swingarm fork attaches to the electronics housing on opposite sides of the electronics housing; and
wherein the swingarm supports an electric hub motor that drives the rear wheel.

2. The electric saddle type vehicle of claim 1, wherein the electronics housing contains an electric motor.

3. The electric saddle type vehicle of claim 1, wherein the front swingarm fork forms a swingarm pivot axis, and wherein the electronics housing descends past the swingarm pivot axis.

4. The electric saddle type vehicle of claim 3, wherein the swingarm rotates about the swingarm pivot axis.

5. The electric saddle type vehicle of claim 1, wherein the swingarm extends rearward of the electronics housing and wherein the electronics housing is connected to a rear surface of a battery housing, wherein the battery housing includes an electrical energy storage unit.

6. An electric saddle type vehicle comprising:
a saddle type vehicle chassis including:
a steering mount structure at a front end of the chassis, wherein the steering mount structure is configured to attach to a front suspension;
a structural member connected to and extending from a rear end of the steering mount structure to a front end of an electronics housing, wherein the electronics housing contains electrical components; and
a swingarm configured to support a rear wheel, wherein the swingarm has a front swingarm fork, wherein the front swingarm fork attaches to the electronics housing on opposite sides of the electronics housing;
wherein the front swingarm fork forms a swingarm pivot axis, and wherein the electronics housing descends past the swingarm pivot axis; and
wherein wiring exits the electronics housing and enters the swingarm at a location substantially co-linear with the swingarm pivot axis.

7. An electric saddle type vehicle comprising:
a saddle type vehicle chassis including:
a steering mount structure at a front end of the chassis, wherein the steering mount structure is configured to attach to a front suspension;
a structural member connected to and extending from a rear end of the steering mount structure to a front end of an electronics housing, wherein the electronics housing contains electrical components; and
a swingarm configured to support a rear wheel, wherein the swingarm has a front swingarm fork, wherein the front swingarm fork attaches to the electronics housing on opposite sides of the electronics housing; and
wherein the front swingarm fork is attached a pair of bosses spaced away from an outer surface of the electronics housing, wherein each boss of the pair of bosses includes a bearing.

8. The electric saddle type vehicle of claim 7, wherein the front swingarm fork comprises a pair of arms such that each arm is located between one of the pair of bosses and the outer surface of the electronics housing.

9. The electric saddle type vehicle of claim 8, wherein the bearing is retained by a foot peg mount.

10. The electric saddle type vehicle of claim 9, wherein a stub axle is received in the bearing and attached to the swingarm using a bolt.

11. An electric saddle type vehicle comprising:
a saddle type vehicle chassis including:
a steering mount structure at a front end of the chassis, wherein the steering mount structure is configured to attach to a front suspension;
a structural member connected to and extending from a rear end of the steering mount structure to a front end of an electronics housing, wherein the electronics housing contains electrical components;
a swingarm configured to support a rear wheel attached to the electronics housing;
an electric motor configured to drive the rear wheel; and
a radiator for cooling the electric motor is mounted under the swingarm.

12. The electric saddle type vehicle of claim 11, wherein a vehicle control module monitors a temperature of the electric motor and circulates coolant to maintain the temperature of the electric motor.

13. The electric saddle type vehicle of claim 11, wherein a battery housing connected to and positioned below the structural member, wherein the battery housing includes at least one electrical energy storage device and a service disconnect; and wherein when the service disconnect is removed, power from the at least one electrical energy storage device is shut off to external electrical connections.

14. The electric saddle type vehicle of claim 13, wherein removal of the battery housing is prevented unless the service disconnect is removed.

15. An electric saddle type vehicle comprising:
a saddle type vehicle chassis including:
a steering mount structure at a front end of the chassis, wherein the steering mount structure is configured to attach to a front suspension;
a structural member connected to and extending from a rear end of the steering mount structure to a front end of an electronics housing, wherein the electronics housing contains electrical components; and a seat support structure attached to the electronics housing, wherein the seat support structure includes a pair of rails and a pair of passenger grab handles, wherein the seat support structure supports a seat, wherein the seat slides on the pair of rails.

16. The electric saddle type vehicle of claim 15, wherein turn signals are integrated into the pair of passenger grab handles.

17. The electric saddle type vehicle of claim 15, wherein a quick charge port is exposed when the seat is slid rearward.

18. The electric saddle type vehicle of claim 15, further comprising:

a swingarm configured to support a rear wheel attached to the electronics housing, wherein the swingarm has a front swingarm fork, wherein the front swingarm fork attaches to the electronics housing on opposite sides of the electronics housing.

19. The electric saddle type vehicle of claim 18, wherein the front swingarm fork is attached a pair of bosses spaced away from an outer surface of the electronics housing, wherein each boss of the pair of bosses includes a bearing.

* * * * *